(12) United States Patent
Yamaguchi et al.

(10) Patent No.: US 11,733,631 B2
(45) Date of Patent: Aug. 22, 2023

(54) IMAGE FORMING APPARATUS

(71) Applicant: CANON KABUSHIKI KAISHA, Tokyo (JP)

(72) Inventors: Kimiaki Yamaguchi, Chiba (JP); Shinya Suzuki, Chiba (JP); Masahiro Tsujibayashi, Chiba (JP); Shohei Okumura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/868,193

(22) Filed: Jul. 19, 2022

(65) Prior Publication Data
US 2023/0025235 A1  Jan. 26, 2023

(30) Foreign Application Priority Data
Jul. 20, 2021  (JP) ................................. 2021-120035

(51) Int. Cl.
*G03G 15/00* (2006.01)

(52) U.S. Cl.
CPC ..... *G03G 15/5041* (2013.01); *G03G 15/5062* (2013.01)

(58) Field of Classification Search
CPC .......... G03G 15/5025; G03G 15/5041; G03G 15/5062; G03G 15/55
USPC ...................................................... 399/49, 72
See application file for complete search history.

(56) References Cited

U.S. PATENT DOCUMENTS

| | | | | |
|---|---|---|---|---|
| 7,885,587 B2 * | 2/2011 | Matsuda | ............ | G03G 15/5008 399/49 |
| 2011/0076040 A1 * | 3/2011 | Uchidate | ............ | G03G 15/0194 399/72 |

FOREIGN PATENT DOCUMENTS

| | | |
|---|---|---|
| JP | 2014-139604 A | 7/2014 |
| JP | 2017-201381 A | 11/2017 |

* cited by examiner

*Primary Examiner* — Hoang X Ngo
(74) *Attorney, Agent, or Firm* — Venable LLP

(57) ABSTRACT

An image forming apparatus includes an image forming unit configured to convey a recording medium and form an image on the recording medium based on an image forming condition; and a controller configured to control the image forming unit to form a test image and a scale image extending in a conveyance direction in which the recording medium is conveyed, obtain user instruction information related to a density fluctuation of the test image in the conveyance direction, and generate the image forming condition to suppress image density unevenness in the conveyance direction in an image to be formed by the image forming unit based on the user instruction information.

4 Claims, 15 Drawing Sheets

FIG. 7

```
DENSITY UNEVENNESS ADJUSTMENT MODE                          94
 PLEASE PRESS "FIRST CHART OUTPUT"

┌─────────────┐
              │ FIRST CHART │
              │   OUTPUT    │
              └─────────────┘
                                         ┌─────────┐
                                         │ CANCEL  │
                                         └─────────┘
```

FIG. 8

```
DENSITY UNEVENNESS ADJUSTMENT MODE                          94
 PLEASE PUT CHECK MARK IN PERIOD HAVING DENSITY UNEVENNESS
 PLEASE PRESS "SECOND CHART OUTPUT" AFTER PUTTING CHECK MARK

PERIOD
         A    [✓]
         B    [ ]              ┌──────────────┐
                               │ SECOND CHART │
         C    [ ]              │    OUTPUT    │
                               └──────────────┘
```

FIG. 9

```
DENSITY UNEVENNESS ADJUSTMENT MODE                          94
 PLEASE INPUT NUMBER OF POSITION HAVING HIGHEST DENSITY
 PLEASE PRESS "THIRD CHART OUTPUT" AFTER INPUTTING NUMBER

PHASE
         A    [4]  (0~11)
         B    [ ]  (0~11)       ┌──────────────┐
                                │ THIRD CHART  │
         C    [ ]  (0~11)       │    OUTPUT    │
                                └──────────────┘
```

FIG. 10

```
DENSITY UNEVENNESS ADJUSTMENT MODE                          94
 PLEASE INPUT NUMBER HAVING LEAST VISIBLE DENSITY UNEVENNESS
 PLEASE PRESS "OK" AFTER INPUTTING NUMBER

AMPLITUDE
         A    [3]  (0~4)
         B    [ ]  (0~4)
                                         ┌─────────┐
                                         │   OK    │
         C    [ ]  (0~4)                 └─────────┘
```

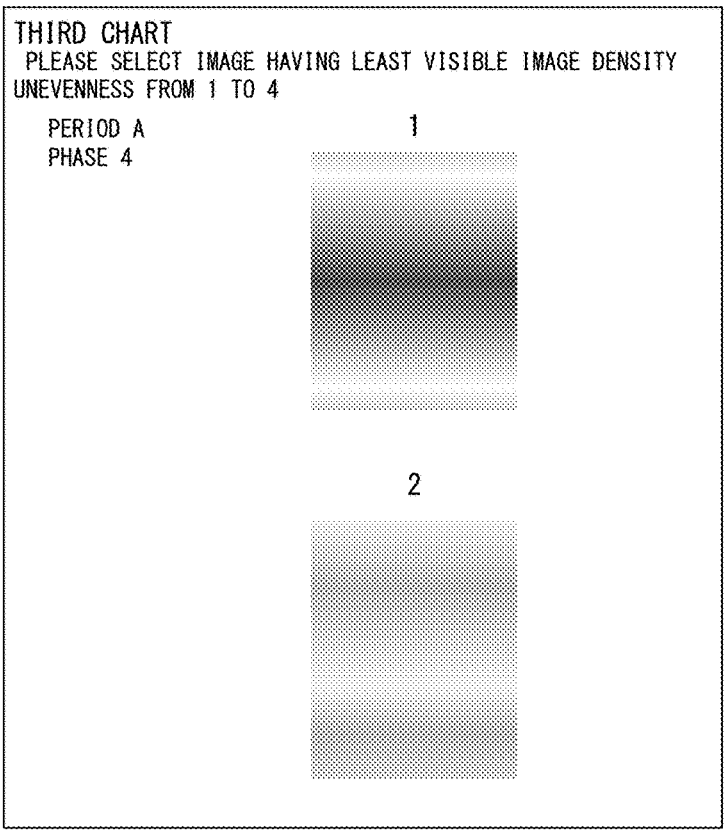
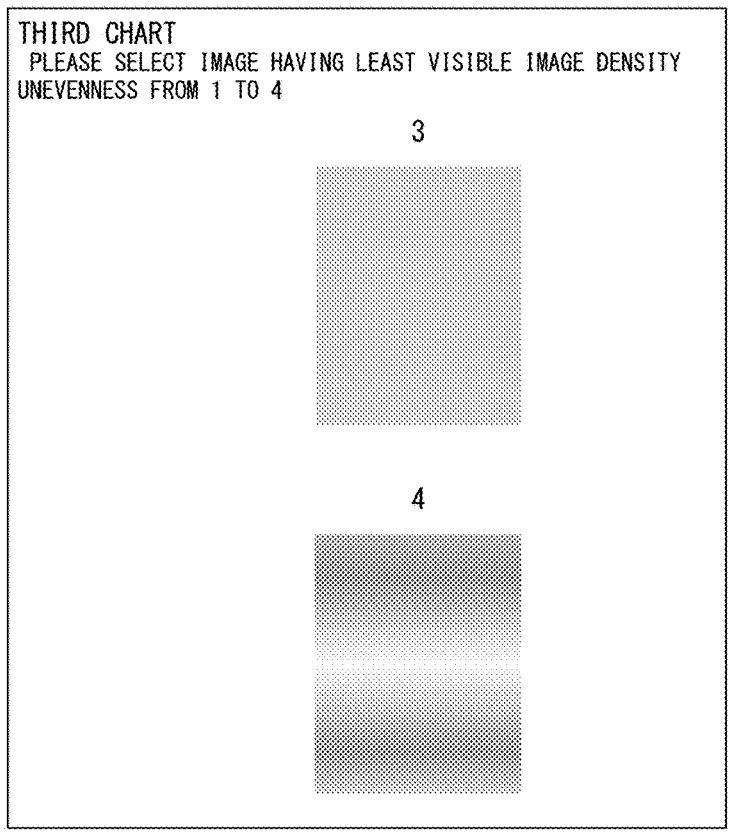
FIG. 13

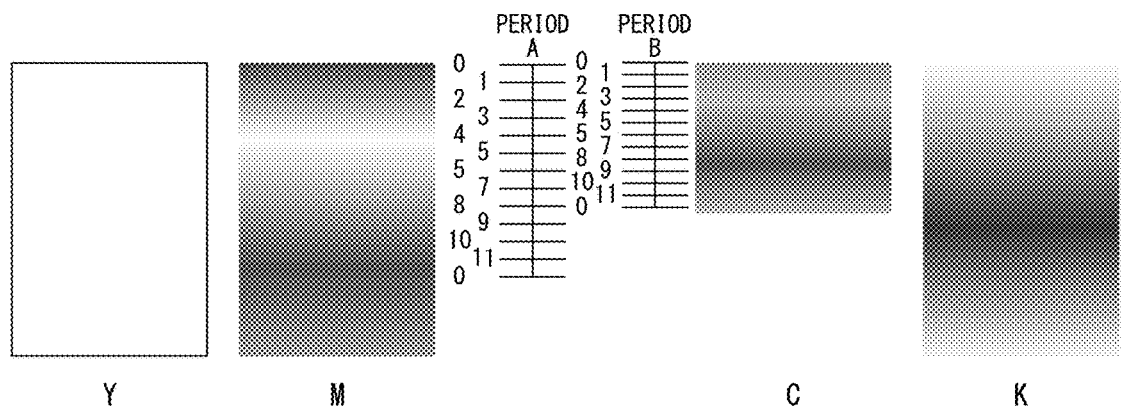
CONVEYING
DIRECTION
FIG. 19

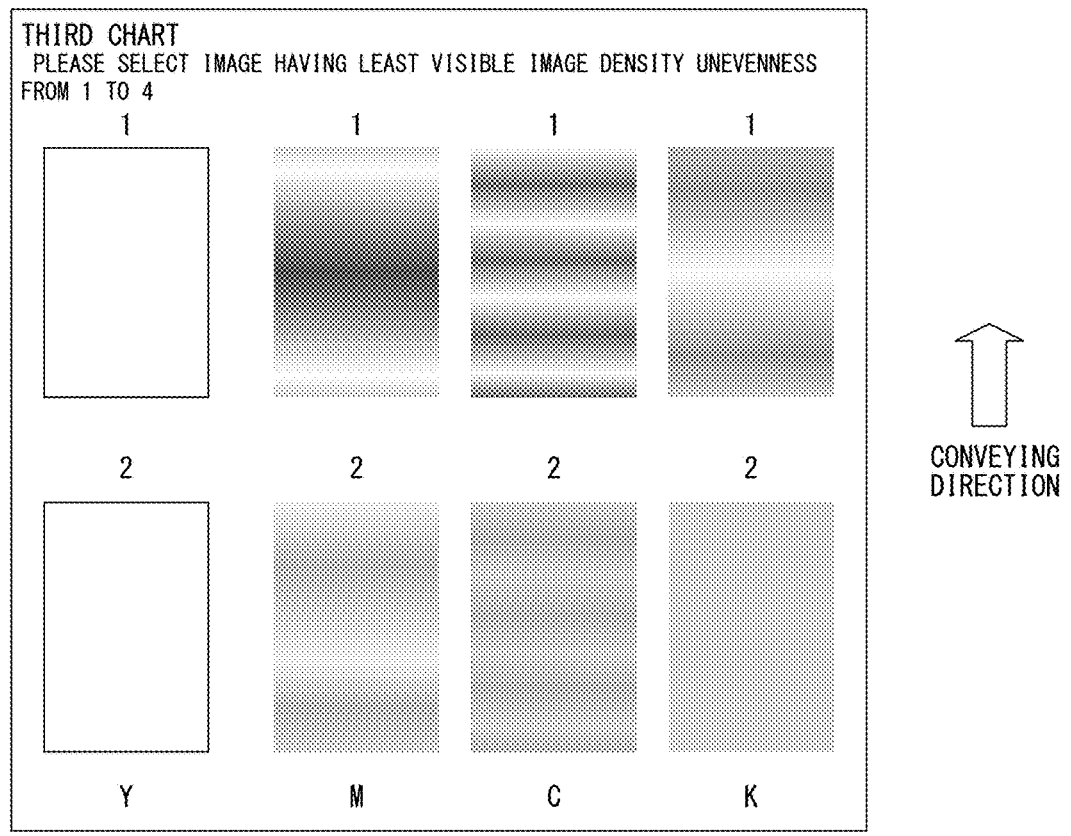
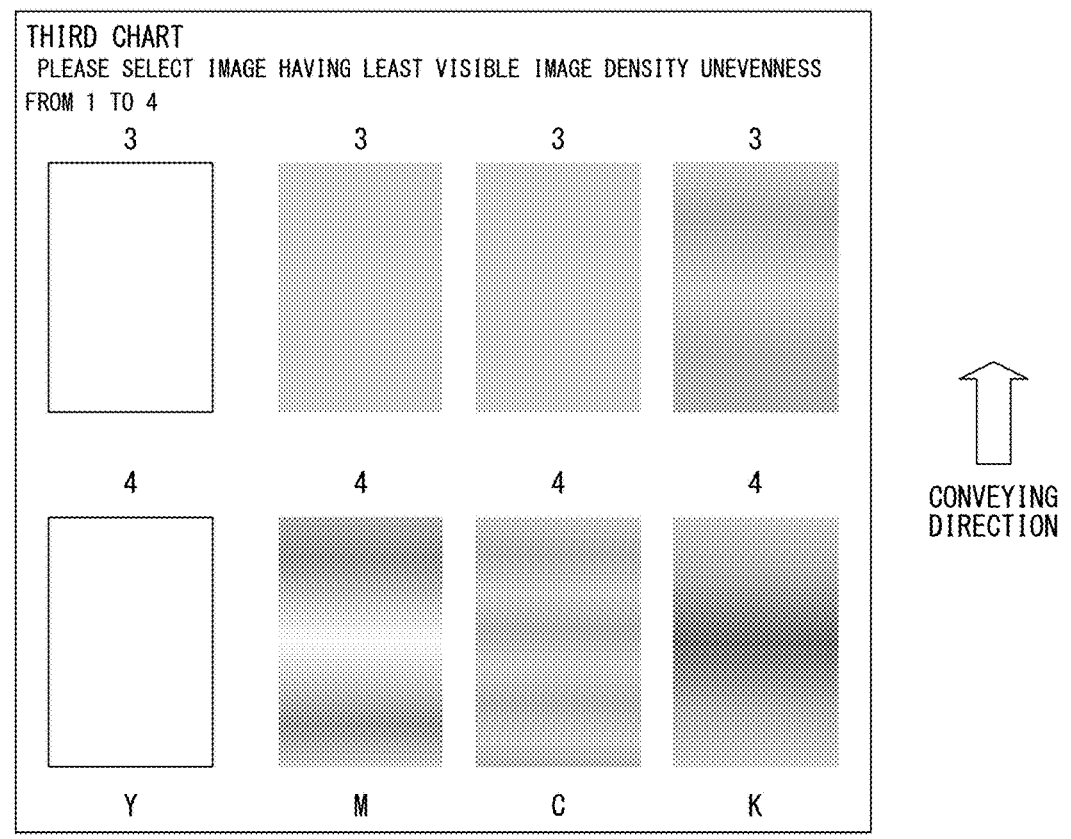
FIG. 20

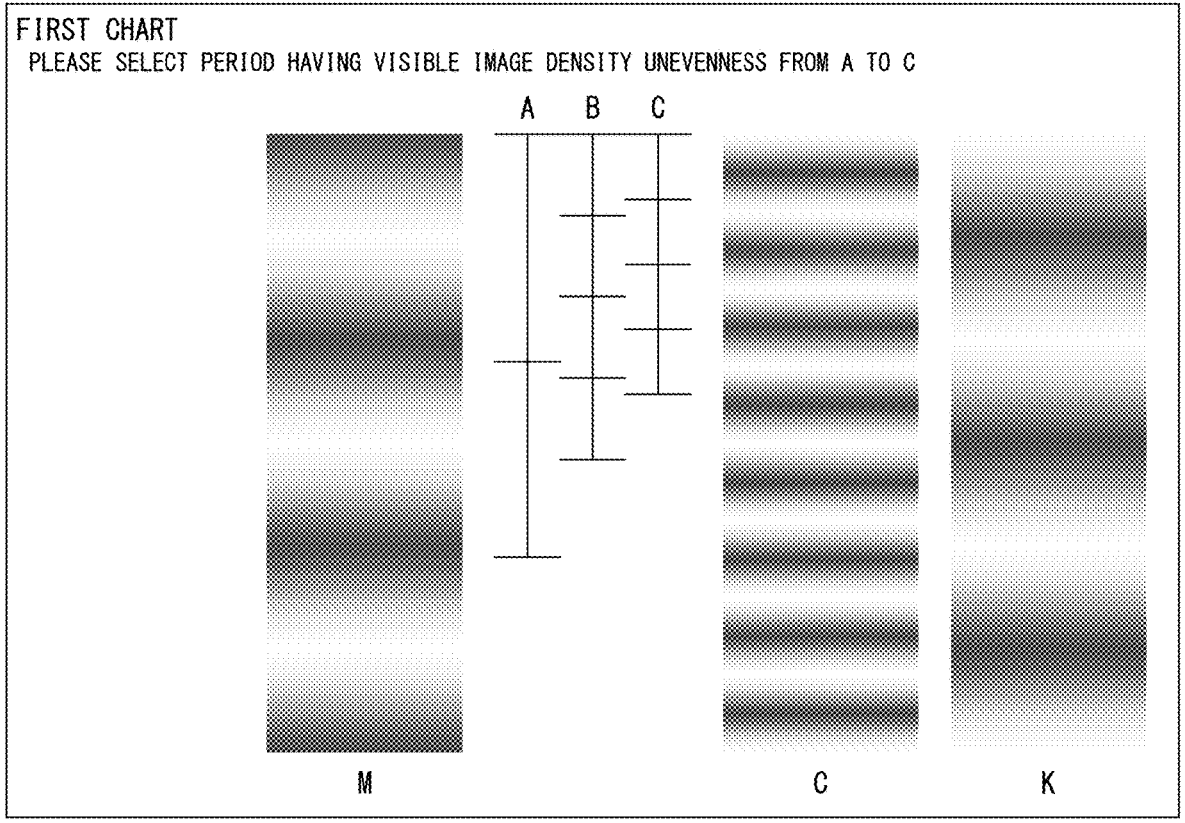
CONVEYING
DIRECTION
FIG. 22

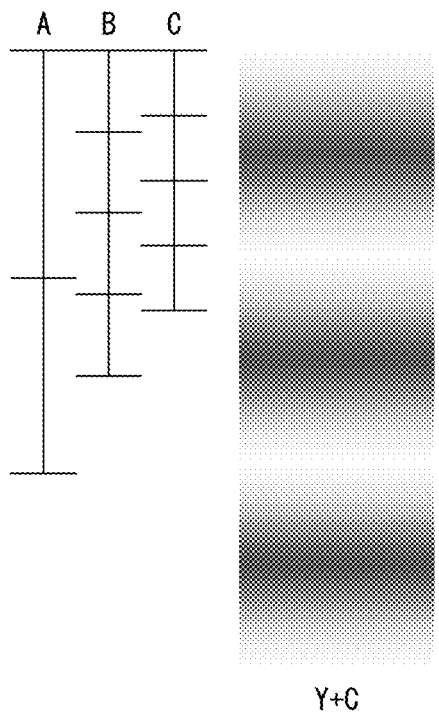
CONVEYING
DIRECTION
FIG. 23

IMAGE FORMING APPARATUS

BACKGROUND OF THE INVENTION

Field of the Invention

The present disclosure relates to an image forming apparatus, such as a printer, a copying machine, a facsimile machine, or a multifunction apparatus.

Description of the Related Art

An image forming apparatus includes a plurality of rotary members, such as a photosensitive drum, a charging roller, a developer carrying member, and a sheet conveyance roller. Among them, in the photosensitive drum, the charging roller, and the developer carrying member, there may be caused rotational runout, sensitivity unevenness, resistance unevenness, and the like to cause occurrence of image density unevenness. Each of the photosensitive drum, the charging roller, and the developer carrying member has a short rotation period, and hence an image in one page may include easily-visible periodic image density unevenness.

For example, when the rotational runout is caused in the photosensitive drum, a distance between the photosensitive drum and the developer carrying member becomes unstable. The developer carrying member causes toner to adhere to the photosensitive drum through use of an electric field generated by a potential difference between the developer carrying member and the photosensitive drum so that a toner image is formed on the photosensitive drum. When the distance between the photosensitive drum and the developer carrying member becomes unstable, the intensity of the electric field varies, and hence an amount of toner adhering to the photosensitive drum varies. Accordingly, the rotational runout of the photosensitive drum causes the periodic image density unevenness in the image (toner image) to be formed on the photosensitive drum. Even when the rotational runout is caused in the developer carrying member, the image density unevenness is caused for the same reason.

In the photosensitive drum, due to reasons such as environmental variations and temporal changes, the sensitivity unevenness is caused in a photosensitive layer on a surface of the photosensitive drum. When the sensitivity unevenness is caused in the photosensitive drum, even if the photosensitive drum is exposed with a constant amount of exposure light, a difference is caused in a light potential being a potential after the exposure. The difference in the light potential causes the image density unevenness as well.

The charging roller causes a discharge current to flow so as to uniformly charge the photosensitive layer of the photosensitive drum. When there is unevenness (resistance unevenness) in a resistance value of the charging roller, a discharge current amount varies, and a difference is caused in a dark potential being a potential after the charging of the photosensitive layer of the photosensitive drum. Even when the photosensitive layer of the photosensitive drum in a state in which a difference is caused in the dark potential is exposed with a constant amount of exposure light, a difference is caused in the light potential being the potential after the exposure. The difference in the light potential causes the image density unevenness.

In order to suppress the periodic image density unevenness to be caused by the rotary member as described above, in Japanese Patent Application Laid-open No. 2014-139604, there is disclosed a technology in which an image having a size equal to or larger than one rotation of the photosensitive drum is formed, the periodic image density unevenness is detected based on reading results of this image, and the detected image density unevenness is suppressed. The image density unevenness is suppressed by adjusting a charging bias, a developing bias, an exposure light amount condition, and the like. In Japanese Patent Application Laid-open No. 2017-201381, there is disclosed a technology in which an image for checking the image density unevenness is formed on a recording medium, and a user who has checked this image inputs adjustment data through an operation unit so as to finely adjust the image density unevenness.

However, when the image density unevenness is to be finely adjusted based on the adjustment data corresponding to the image for checking the image density unevenness, whether or not the adjustment data is appropriate cannot be known unless the image for checking the image density unevenness is re-printed onto the recording medium. When the adjustment data is inappropriate, the input of the adjustment data and the printing of the image for checking the image density unevenness onto the recording medium are repeatedly performed. This operation causes a longer adjustment time of the image density unevenness. The present disclosure has been made in view of the above-mentioned problem, and has an object to provide an image forming apparatus capable of shortening an adjustment time of image density unevenness.

SUMMARY OF THE INVENTION

An image forming apparatus according to the present disclosure includes an image forming unit configured to convey a recording medium, and form an image on the recording medium based on an image forming condition; and a controller configured to control the image forming unit to form a test image and a scale image extending a conveyance direction in which the recording medium is conveyed, obtain user instruction information related to a density fluctuation of the test image in the conveyance direction, and generate the image forming condition to suppress image density unevenness in the conveyance direction in an image to be formed by the image forming unit based on the user instruction information.

Further features of the present invention will become apparent from the following description of exemplary embodiments (with reference to the attached drawings).

BRIEF DESCRIPTION OF THE DRAWINGS

FIG. 7 is an exemplary view of an input screen.

FIG. 8 is an exemplary view of an input screen.

FIG. 9 is an exemplary view of an input screen.

FIG. 10 is an exemplary view of an input screen.

FIG. 13 is an exemplary view of a third chart.

FIG. 19 is an exemplary view of a second chart.

FIG. 20 is an exemplary view of a third chart.

FIG. 22 is an exemplary view of a first chart.

FIG. 23 is an exemplary view of a first chart.

DESCRIPTION OF THE EMBODIMENTS

Now, embodiments of the present disclosure are described in detail with reference to the drawings.

First Embodiment

Figure 1:
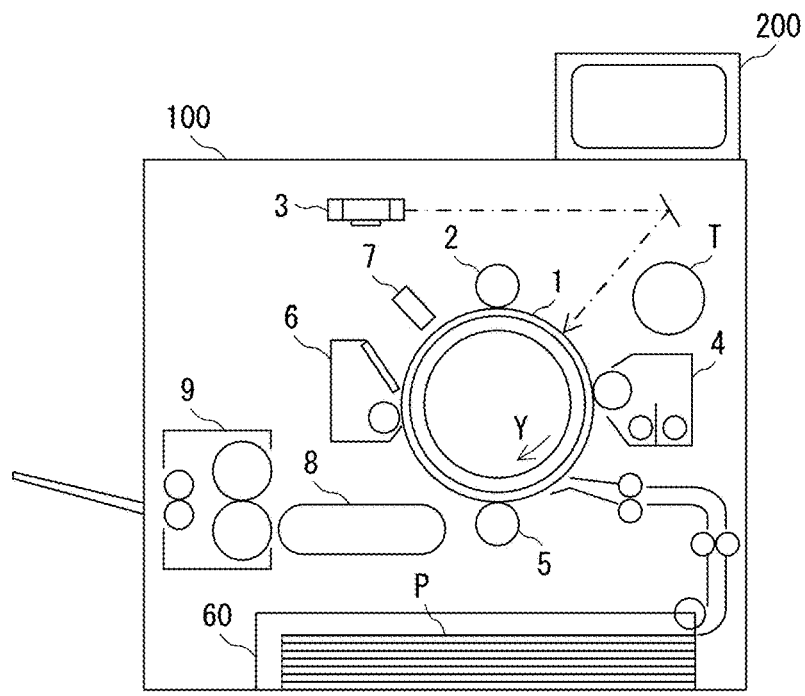
FIG. 1 is a configuration diagram of an image forming apparatus.

FIG. 1 is a configuration diagram of an image forming apparatus according to a first embodiment of the present disclosure. An image forming apparatus 100 includes therein a photosensitive drum 1, a charging roller 2, an exposing device 3, a developing device 4, a transfer charging device 5, a cleaner 6, a pre-exposing device 7, a conveyance belt 8, a fixing device 9, and a sheet feeding cassette 60. On an upper portion of a casing of the image forming apparatus 100, an operation unit 200 is provided.

The photosensitive drum 1 is a drum-shaped image bearing member including a photosensitive layer on its surface. The photosensitive drum 1 rotates in the arrow Y direction during an image forming operation. The charging roller 2 uniformly charges the surface of the photosensitive drum 1. The exposing device 3 exposes, based on image information, the photosensitive member whose surface is uniformly charged with light. With the exposure, an electrostatic latent image is formed on the surface of the photosensitive drum 1 based on the image information. The developing device 4 causes toner to adhere to the electrostatic latent image formed on the surface of the photosensitive drum 1 so as to visualize the image. In this manner, a toner image is formed on the surface of the photosensitive drum 1. The developing device 4 is replenished with toner by a toner replenishing unit T.

The transfer charging device 5 electrostatically transfers the toner image formed on the photosensitive drum 1 onto a surface of a recording medium P. The recording medium P is stored in the sheet feeding cassette 60, and is fed from the sheet feeding cassette 60 to the transfer charging device 5 in accordance with the timing at which the formation of the toner image onto the photosensitive drum 1 is started. The recording medium P having the toner image transferred thereon is conveyed to the fixing device 9 by the conveyance belt 8. The fixing device 9 applies heat and pressure to the recording medium P having the toner image transferred thereon. In this manner, the toner image is melted and pressure-bonded to the recording medium P.

Transfer residual toner remaining on the photosensitive drum 1 after the transfer is removed by the cleaner 6. Further, residual charges on the photosensitive drum 1 are removed by the pre-exposing device 7. The photosensitive drum 1 is used for the next image formation after the transfer residual toner and the residual charges are removed.

The operation unit 200 is a user interface to be operated by a user or a service worker. The operation unit 200 includes an input interface and an output interface. The operation unit 200 receives various settings, instructions to start the image forming operation, and the like through the input interface. The operation unit 200 displays input screens, screens showing the state of the image forming apparatus 100, and the like through the output interface.

Figure 2:
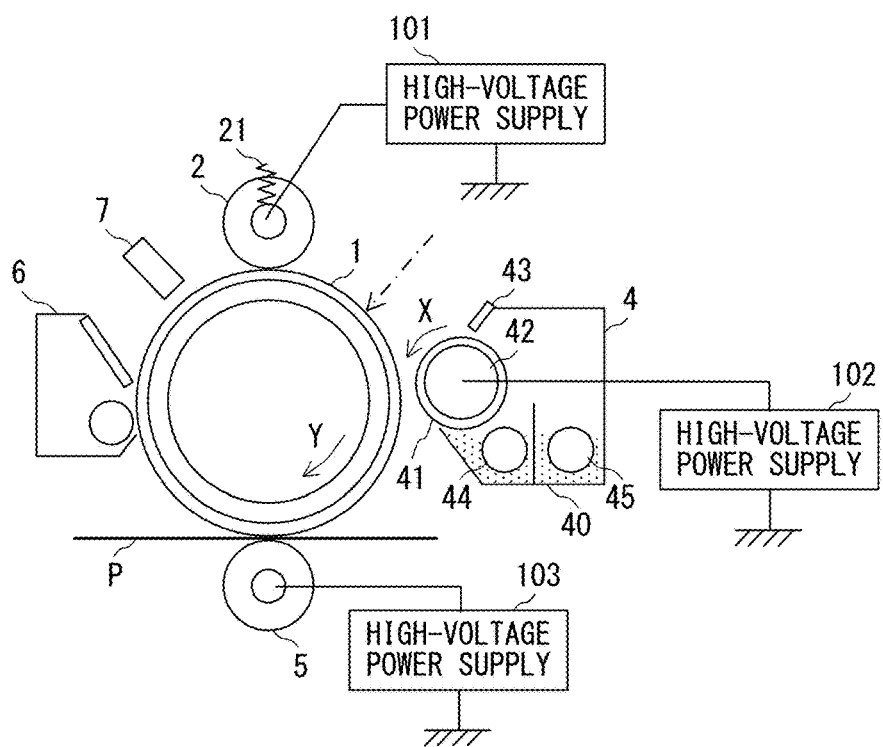
FIG. 2 is a configuration diagram of an image forming unit.

FIG. 2 is a configuration diagram of an image forming unit formed of the photosensitive drum 1, the charging roller 2, the exposing device 3, the developing device 4, the transfer charging device 5, the cleaner 6, and the pre-exposing device 7 of the image forming apparatus 100.

The charging roller 2 has both end portions of a core metal rotatably held by bearing members (not shown), respectively, and is urged toward the photosensitive drum 1 by a pressure spring 21. With such a configuration, the charging roller 2 is brought into pressure-contact with the surface of the photosensitive drum 1 at a predetermined pressing force, and is rotated in association with the rotation of the photosensitive drum 1.

The core metal of the charging roller 2 is applied with a predetermined charging bias voltage by a high-voltage power supply 101. When the charging roller 2 is applied with the charging bias voltage, the charging roller 2 performs contact charging processing of charging the surface of the rotating photosensitive drum 1 to a predetermined potential at a predetermined polarity. In the first embodiment, the charging bias voltage to be applied to the charging roller 2 is an oscillation voltage obtained by superimposing a DC voltage and an AC voltage. For example, the charging bias voltage is an oscillation voltage obtained by superimposing a DC voltage of −500 V and a sine-wave AC voltage having a frequency of 1.3 kHz and a peak-to-peak voltage Vpp of 1.5 kV. With the charging bias voltage, the surface of the photosensitive drum 1 is uniformly charged to −500 V (dark potential Vd) that is the same as the DC voltage applied to the charging roller 2.

The developing device 4 includes a developer container 40. The developer container 40 mainly stores therein two-component developer (developer) including non-magnetic toner (toner) and magnetic carriers (carriers). The developer container 40 includes an opening portion to be arranged opposed to the photosensitive drum 1. A developing sleeve 41 serving as a developer carrying member is arranged so as to be partially exposed from the opening portion. The developing sleeve 41 is made of a non-magnetic material, and has a magnet 42 fixed therein. The magnet 42 generates a magnetic field around the developing sleeve 41.

Inside of the developer container 40, a first stirring screw 44 and a second stirring screw 45 are provided as members for stirring and conveying the developer. The two-component developer inside of the developer container 40 is circulated and conveyed inside of the developer container 40 while being stirred by the first stirring screw 44 and the second stirring screw 45.

At the time of a developing operation, the developing sleeve 41 rotates in the arrow X direction (counterclockwise direction), and the photosensitive drum 1 rotates in the arrow Y direction (clockwise direction). The developing sleeve 41 carries the two-component developer whose thickness is reduced by a regulating member 43, and rotates to convey the carried two-component developer. That is, the carriers having the triboelectrically-charged toner adhering to their surfaces are conveyed while being retained on the developing sleeve 41 by the magnetic field generated by the magnet 42.

In the first embodiment, there are used the photosensitive drum 1 having a diameter of 30 mm, the charging roller 2 having a diameter of 12 mm, and the developing sleeve 41 having a diameter of 16 mm. In order to improve developing performance of the toner with respect to the electrostatic latent image, a linear speed at an opposing position between the photosensitive drum 1 and the developing sleeve 41 is set so that the developing sleeve 41 is driven at a speed which is 1.7 times as fast as the speed of the photosensitive drum 1.

As the non-magnetic toner of the two-component developer, for example, particles obtained by kneading a pigment into a resin binder having polyester as its main body and grinding and classifying a resultant material can be suitably used. An average particle diameter of the non-magnetic toner in the first embodiment is set to about 6 µm in consideration of an image quality and handleability. In addition, as required, for the purpose of ensuring mobility and chargeability of the toner, silica, alumina, titania, organic resin particles, or the like may be added as external additives. As the magnetic carriers of the two-component developer, particles which are obtained by coating cores mainly made of ferrite or other magnetic materials with silicone, acrylic resin, or other resins, and have a 50% particle diameter (D50) of about 40 µm can be suitably used.

In the first embodiment, the developer inside of the developing container 40 is two-component developer obtained by mixing toner and carriers at the weight ratio of about 8:92 to have a toner density (ratio (percentage) of a toner weight to a total developer weight:TD ratio) of 8%, and 200 g of developer is stored in the developer container 40. When the toner is consumed through the developing processing and the toner density is thus reduced, the developer container 40 is replenished with the toner from the toner replenishing unit T.

The developing sleeve 41 is applied with a predetermined developing bias voltage from a high-voltage power supply 102. The developing bias voltage in the first embodiment is an oscillation voltage obtained by superimposing a DC voltage and an AC voltage. For example, the developing bias voltage is an oscillation voltage obtained by superimposing a DC voltage of −350 V and a square-wave AC voltage having a frequency of 8.0 kHz and a peak-to-peak voltage Vpp of 1.8 kV. With the potential difference between the developing bias voltage and the electrostatic latent image formed on the surface of the photosensitive drum 1, the toner moves from the developing sleeve 41 to the photosensitive drum 1 so that the electrostatic latent image is subjected to reversal development.

The transfer charging device 5 is applied with a transfer bias voltage having a predetermined condition from a high-voltage power supply 103. The transfer bias voltage in the first embodiment is a DC voltage. For example, the transfer bias voltage is a DC voltage of +800 V. With the transfer bias voltage, the toner image formed on the photosensitive drum 1 is transferred onto the recording medium P.

Each of the photosensitive drum 1, the charging roller 2, and the developing sleeve 41 in the first embodiment includes a phase detection mechanism for detecting a phase of rotation. As an example of the phase detection mechanism, FIG. 3 exemplifies a phase detection sensor 50 for detecting the rotation phase of the photosensitive drum 1. This phase detection sensor 50 includes a photointerrupter 51.

The photosensitive drum 1 has a drum shaft 53 being a rotation center shaft which is connected to an output shaft of a drive motor 54 through intermediation of a coupling (not shown). The photosensitive drum 1 is driven to rotate by a drive force of the drive motor 54. The phase detection sensor 50 of the photosensitive drum 1 includes, in addition to the photointerrupter 51, a light blocking member 52 which is rotated and moved along with the rotation of the drum shaft 53. The light blocking member 52 blocks an optical path of the photointerrupter 51 when the photosensitive drum 1 rotates and reaches a predetermined phase (rotation position). When the optical path of the photointerrupter 51 is blocked, the photointerrupter 51 detects that the photosensitive drum 1 has reached a predetermined phase (rotation position). In this manner, the photointerrupter 51 can detect the rotation position of the photosensitive drum 1. Each of the charging roller 2 and the developing sleeve 41 includes a phase detection device having a substantially similar configuration as well so that the rotation position of each of the charging roller 2 and the developing sleeve 41 can be detected.

Figure 3:
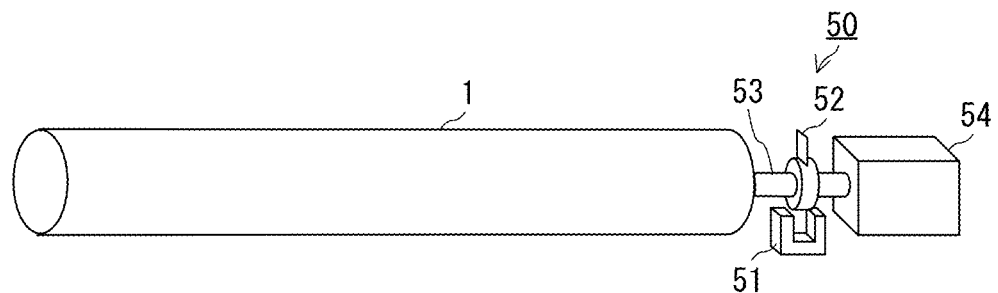
FIG. 3 is an exemplary view of a phase detection sensor.

In the example of FIG. 3, a direct drive system in which the photosensitive drum 1 is directly coupled to the drive motor 54 is described, but a speed reduction mechanism may be provided in a transmission path of the drive force from the drive motor 54. The same holds true also for the drive of the developing sleeve 41. The charging roller 2 in the first embodiment is, as described above, brought into pressure-contact with respect to the surface of the photosensitive drum 1 at a predetermined pressing force, and is rotated in association with the rotation of the photosensitive drum 1. Accordingly, the charging roller 2 does not include a drive motor.

Figure 4:
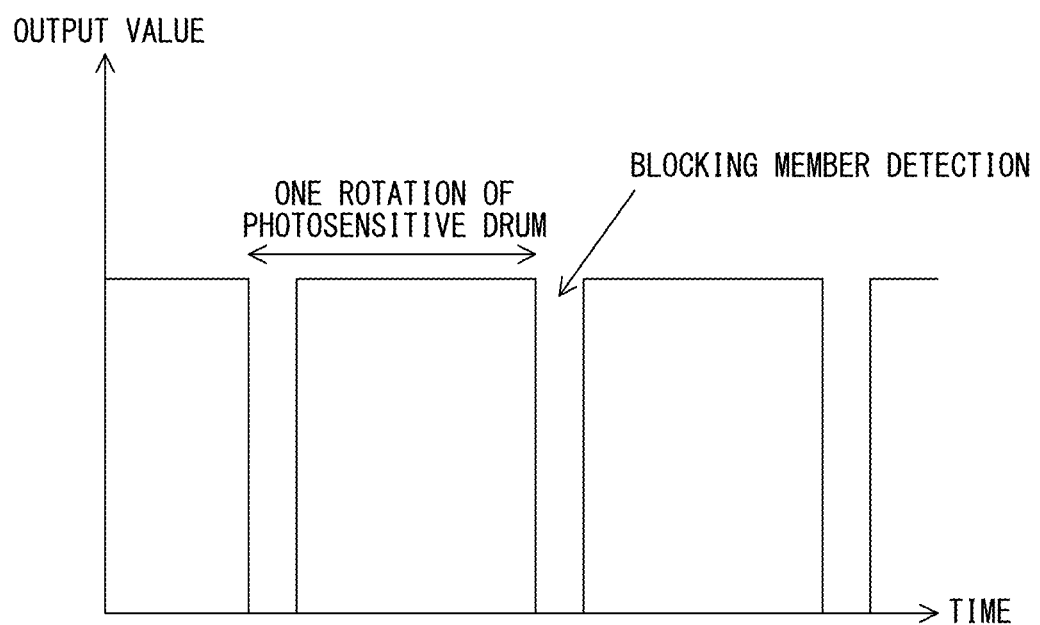
FIG. 4 is an exemplary graph of an output value of a photointerrupter.

FIG. 4 is an exemplary graph of an output value of the photointerrupter 51. When the light blocking member 52 rotated in synchronization with the photosensitive drum 1 is detected by the photointerrupter 51, the output value of the photointerrupter 51 is reduced to almost 0 V. The rotation position (phase) of the photosensitive drum 1 is detected based on the change (edge) of the output value of the photointerrupter 51. An interval in which the photointerrupter 51 detects the light blocking member 52 corresponds to one peripheral length of the photosensitive drum 1. In the first embodiment, the timing at which the output value of the photointerrupter 51 becomes 0 V due to the detection of the light blocking member 52 is referred to as "home position."

Figure 5:
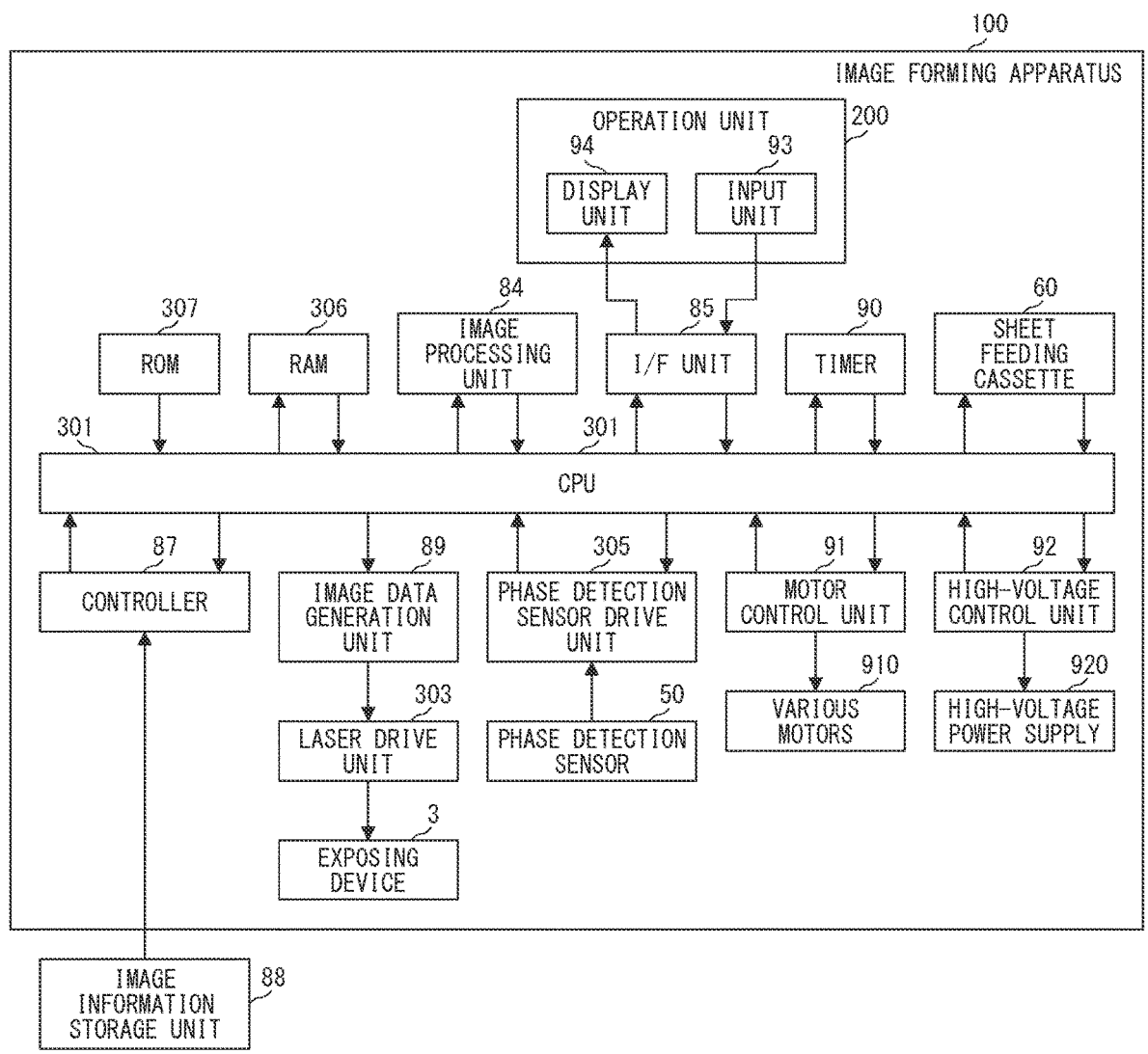
FIG. 5 is a hardware configuration diagram of the image forming apparatus.

FIG. 5 is a hardware configuration diagram of the image forming apparatus 100. The image forming apparatus 100 includes an information processing device including a central processing unit (CPU) 301, a random access memory (RAM) 306, and a read only memory (ROM) 307. The CPU 301 is connected to an image data generation unit 89, a phase detection sensor drive unit 305, a motor control unit 91, a high-voltage control unit 92, an image processing unit 84, an I/F unit 85, a timer 90, a controller 87, and the sheet feeding cassette 60.

The CPU 301 executes a computer program stored in the ROM 307 to control the entire operation of the image forming apparatus 100. The RAM 306 provides a work area when the CPU 301 executes processing. The CPU 301 executes processing of generating various command signals and computation processing in order to operate various sensors, motors, and the like provided in the image forming apparatus 100.

The image data generation unit 89 is connected to a laser drive unit 303 for driving the exposing device 3. The image data generation unit 89 is controlled by the CPU 301 so as to convert various types of image data into signals for laser control (image information) and transmit the signals to the laser drive unit 303. The image data generation unit 89 also has a function of generating a test image to be described later. The laser drive unit 303 drives a laser element of the exposing device 3 based on the signals transmitted from the image data generation unit 89 so as to control lighting and a light amount of laser.

The phase detection sensor drive unit 305 is connected to the phase detection sensor 50. The phase detection sensor drive unit 305 is controlled by the CPU 301 so as to control the operation of the phase detection sensor 50 as described above. The motor control unit 91 is connected to various motors 910 included in the image forming apparatus 100, such as the drive motor 54 described above. The motor control unit 91 is controlled by the CPU 301 so as to control drive timings and drive speeds of the various motors 910. The various motors 910 control the drive of rotary members included in the image forming apparatus 100. The high-voltage control unit 92 is connected to a high-voltage power supply 920, such as the above-mentioned high-voltage power supplies 101, 102, and 103. The high-voltage control unit 92 is controlled by the CPU 301 so as to control the high-voltage power supply 920 and to control output of a bias voltage required for an image forming process, such as the charging bias voltage, the developing bias voltage, or the transfer bias voltage.

The I/F unit 85 is an interface between the CPU 301 and the operation unit 200. The operation unit 200 includes, as described above, the input interface and the output interface. In this case, an input unit 93 including various key buttons, a touch panel, or the like is provided as the input interface. A display unit 94 including a display or the like is provided as the output interface. Various settings, instructions, and the like input through the input unit 93 are input to the CPU 301 via the I/F unit 85. The CPU 301 displays an input screen or the like on the display unit 94 via the I/F unit 85. The I/F unit 85 may be configured to perform communication control to/from an external device such as a personal computer, in place of the operation unit 200. In this case, various settings, instructions, and the like are input from the personal computer, and an input screen or the like is displayed on the personal computer.

The CPU 301 controls the operation of the sheet feeding cassette 60 so as to control the feeding of the recording medium P stored in the sheet feeding cassette 60. Further, the CPU 301 can determine, based on various sensors provided on the sheet feeding cassette 60, whether or not the recording medium P is stored in the sheet feeding cassette 60 and whether or not the sheet feeding cassette 60 is mounted on the image forming apparatus 100.

The controller 87 acquires the image information from an image information storage unit 88 provided outside of the image forming apparatus 100. The controller 87 transmits the acquired image information to the CPU 301. The CPU 301 subjects the acquired image information to various types of processing by the image processing unit 84 for use in image formation. The image processing unit 84 transmits processing results of the image information to the image data generation unit 89. The image data generation unit 89 performs the above-mentioned processing through use of the processing results of the image information as image data.

(Image Density Unevenness Correction)

Figure 6:
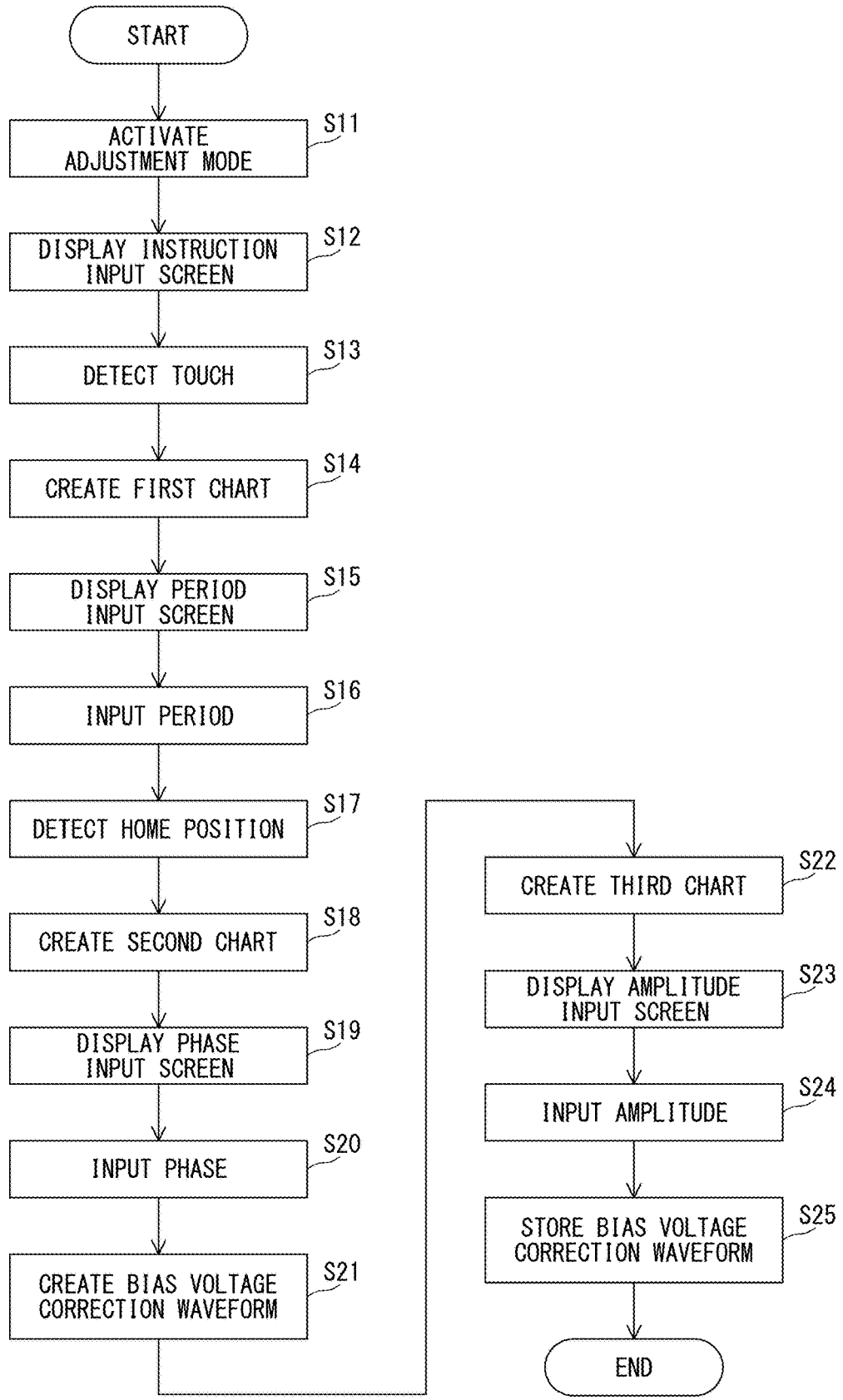
FIG. 6 is a flow chart for illustrating image density unevenness correction processing.
Figure 11:
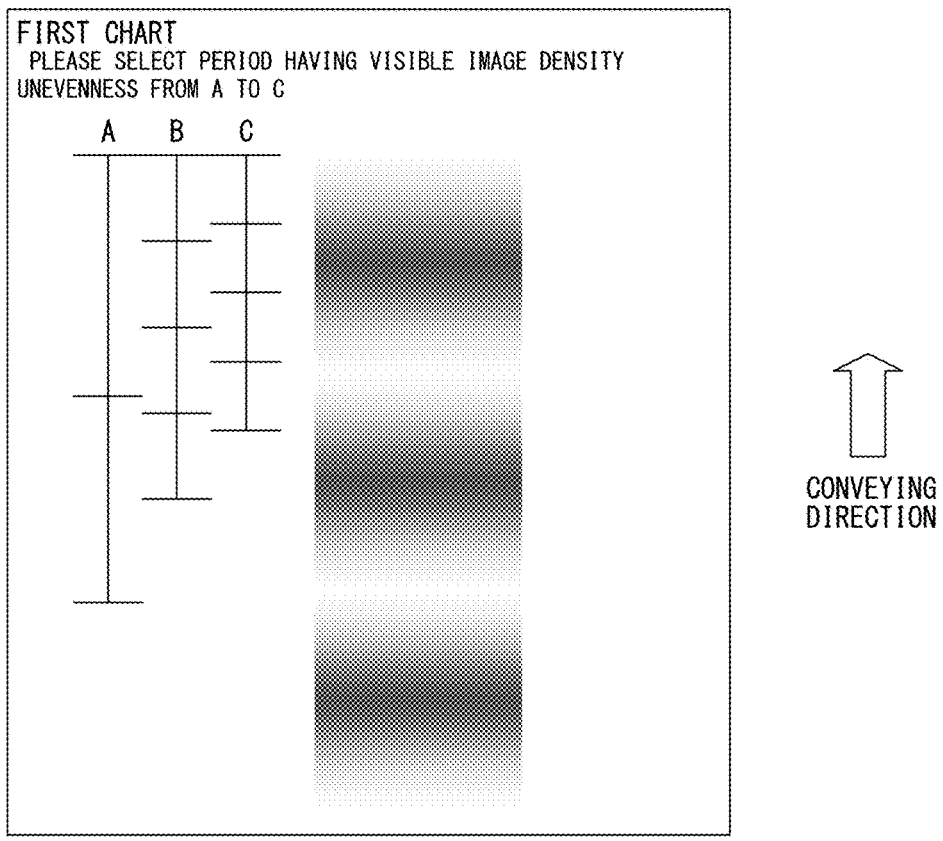
FIG. 11 is an exemplary view of a first chart.
Figure 12:
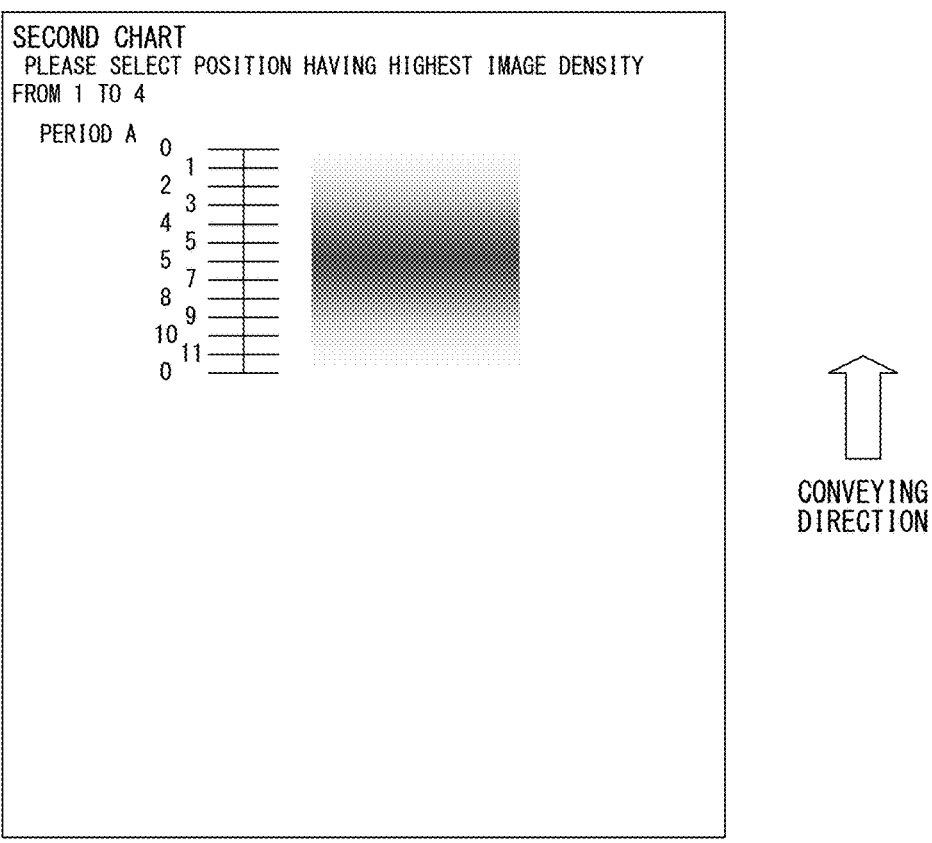
FIG. 12 is an exemplary view of a second chart.

FIG. 6 is a flow chart for illustrating image density unevenness correction processing performed by the image forming apparatus 100 having the above-mentioned configuration. The image density unevenness to be corrected here is periodic image density unevenness caused due to rotation of a plurality of rotary members, such as the photosensitive drum 1, the charging roller 2, and the developing sleeve 41. FIG. 7 to FIG. 10 are exemplary views of input screens to be displayed on the display unit 94 at the time of the image density unevenness correction processing. FIG. 11, FIG. 12, and FIG. 13 are exemplary views of charts to be created at the time of the image density unevenness correction processing. Each of the charts is created by printing a test image for image density unevenness correction onto the recording medium P.

The image density unevenness correction processing is started when the user or the service worker inputs a start instruction of the image density unevenness correction through the input unit 93 of the operation unit 200. The CPU 301 acquires this start instruction from the input unit 93 so as to activate an adjustment mode (Step S11), and displays an input screen for giving an instruction to output a chart exemplified in FIG. 7 on the display unit 94 (Step S12). When the user or the service worker selects a "cancel" button from this input screen, the image density unevenness correction processing is ended.

When the CPU 301 detects the selection of a "first chart output" button performed by the user or the service worker (Step S13), the CPU 301 causes the image forming apparatus 100 to create a first chart exemplified in FIG. 11 under an image forming condition in which no image density unevenness correction is performed (Step S14). The first chart is discharged from the image forming apparatus 100. In the first chart, a band-shaped test image which is long in a conveying direction of the recording medium P, scales representing periods of the rotary members, and instruction messages for the user or the service worker to perform the next operation are printed.

As the scales printed in the first chart in the first embodiment, "A" represents the period of the photosensitive drum 1, "B" represents the period of the charging roller 2, and "C" represents the period of the developing sleeve 41. As described above, in the first embodiment, the photosensitive drum 1 has a diameter of 30 mm, the charging roller 2 has a diameter of 12 mm, and the developing sleeve 41 has a diameter of 16 mm. The linear speed at the opposing position between the photosensitive drum 1 and the developing sleeve 41 is set so that the developing sleeve 41 is driven at a speed which is 1.7 times as fast as the speed of the photosensitive drum 1. Accordingly, the scales are printed so that the period of A is 94.2 mm, the period of B is 37.7 mm, and the period of C is 29.6 mm.

The CPU 301 which has created the first chart displays a period input screen exemplified in FIG. 8 on the display unit 94 (Step S15). The user or the service worker checks the first chart, and inputs, through the input unit 93, a symbol of a period having noticeable image density unevenness from the input screen of FIG. 8. In Step S15, the input unit 93 is input user instruction information related to a density fluctuation of the first chart in the conveyance direction. Further, the user or the service worker selects a "second chart output" button through the input unit 93. The CPU 301 acquires the symbol of the period having the noticeable image density unevenness from the input unit 93, and detects that the "second chart output" button has been selected (Step S16). In FIG. 8, the symbol A is input as the period having the noticeable image density unevenness.

The CPU 301 detects the home position of the rotary member corresponding to the symbol of the selected period through use of the phase detection sensor 50 (Step S17). The CPU 301 creates a second chart exemplified in FIG. 12 so that the timing of the detected home position and the position of the image to be formed are matched with each other (Step S18). The second chart is discharged from the image forming apparatus 100. In the second chart, a band-shaped test image (having a length corresponding to one period of the rotary member input in the process step of Step S16) extending in the conveying direction of the recording medium P, a scale obtained by equally dividing one period of this rotary member, and instruction messages for the user or the service worker to perform the next operation are printed. In the first embodiment, a scale obtained by equally dividing one period of the rotary member (photosensitive drum 1) into twelve parts is printed. Numbers of from 0 to 11 are printed for respective divisions of the scale. The test image and the scale are printed so that the position of "0" of the scale matches the home position of the rotary member.

The CPU 301 which has created the second chart displays a phase input screen exemplified in FIG. 9 on the display unit 94 (Step S19). The user or the service worker checks the second chart, and inputs, through the input unit 93, a number of a position having the highest image density from the input screen of FIG. 9. In Step S19, the input unit 93 is input user instruction information related to a density fluctuation of the second chart in the conveyance direction. Further, the user or the service worker selects a "third chart output" button through the input unit 93. The CPU 301 acquires the number of the position having the highest image density from the input unit 93, and detects that the "third chart output" button has been selected (Step S20). In FIG. 9, "4" is input as the position having the highest image density.

Figure 14:
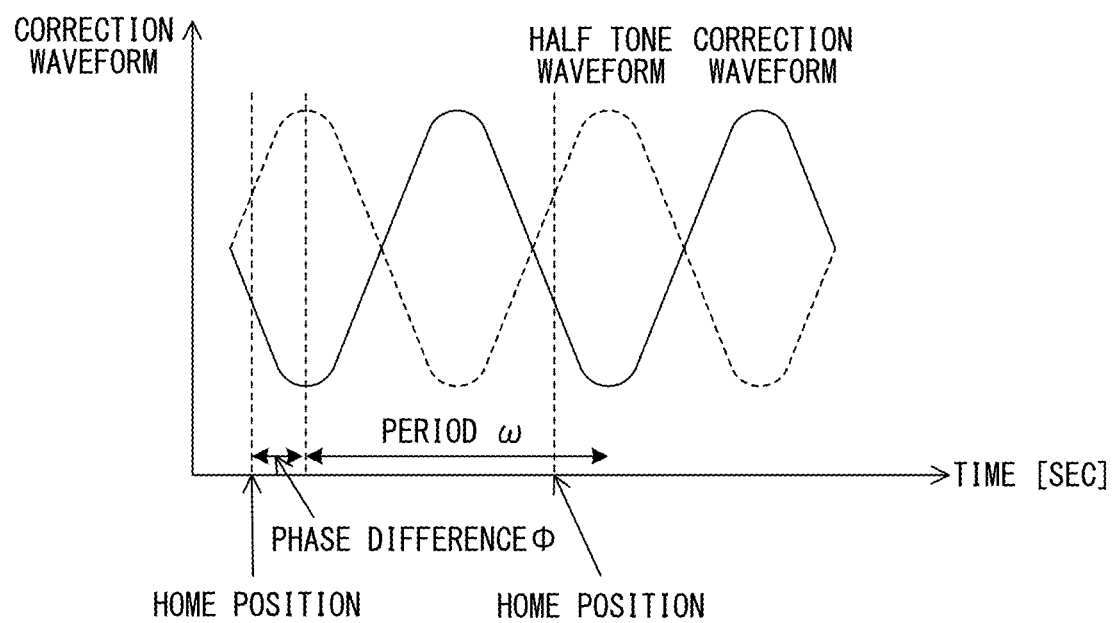
FIG. 14 is an explanatory graph of a bias voltage correction waveform.

The CPU 301 creates a bias voltage correction waveform based on the period acquired in the process step of Step S16 and the position (phase) acquired in the process step of Step S20 (Step S21). FIG. 14 is an explanatory graph of the bias voltage correction waveform. A profile "y" of the image density unevenness is expressed by the following expression based on a period "ω" of the image density unevenness acquired in the process step of Step S16, the home position detected in the process step of Step S17, and the position (phase) having the highest image density acquired in the process step of Step S20. Symbol "φ" represents a phase difference ("position number"×π/12) between the home position and the position (phase) having the highest image density.

$$y=(\text{amplitude}) \times \cos(\omega t + \varphi) \quad (1)$$

A bias voltage correction waveform "x" becomes a waveform obtained by shifting the phase of the profile "y" of the image density unevenness by 180° in order to correct the bias voltage so as to cancel this image density unevenness.

$$x=(\text{amplitude}) \times \cos(\omega t + \varphi + \pi) \quad (2)$$

When the photosensitive drum 1 or the charging roller 2 is selected as having the period of the image density unevenness, the voltage of the bias voltage correction waveform "x" created here is superimposed on the DC voltage to be applied from the high-voltage power supply 101 connected to the charging roller 2. When the developing sleeve 41 is selected as having the period of the image density unevenness, the voltage of the bias voltage correction waveform "x" created here is superimposed on the DC voltage to be applied from the high-voltage power supply 102 connected to the developing sleeve 41.

The CPU 301 prints test images onto the recording medium P while switching an amplitude level of the created bias voltage correction waveform "x", to thereby create a third chart exemplified in FIG. 13 (Step S22). The third chart is discharged from the image forming apparatus 100. In the third chart, four band-shaped test images obtained in different image forming conditions by changing the amplitude level of the bias voltage correction waveform "x" of Expression (2), numbers representing the amplitude levels, and instruction messages for the user or the service worker to perform the next operation are printed. The test images extend in the conveying direction of the recording medium P, and two test images are printed on each of both surfaces of the recording medium P. In the first embodiment, the test images are printed with the voltage of the amplitude of the bias voltage correction waveform "x" being switched in steps of 10 V. The charging roller 2 is applied with a DC voltage of −500 V and a sine-wave AC voltage having a frequency of 1.3 kHz and a peak-to-peak voltage Vpp of 1.5 kV from the high-voltage power supply 101. A DC voltage (correction voltage) corresponding to the bias voltage correction waveform "x" is superimposed on this voltage which is originally applied, and the third chart is created. In the third chart, a plurality of test images are printed in accordance with a plurality of correction voltages whose amplitude levels are changed. When the developing sleeve 41 is selected as having the period of the image density unevenness, the correction voltage corresponding to the bias voltage correction waveform "x" is superimposed on the developing bias voltage applied from the high-voltage power supply 102 while switching the amplitude level, and the third chart is created.

The CPU 301 which has created the third chart displays an amplitude input screen exemplified in FIG. 10 on the display unit 94 (Step S23). The user or the service worker checks the third chart, inputs, through the input unit 93, a number having the least visible image density unevenness from the input screen of FIG. 10, and selects an "OK" button. The CPU 301 acquires the number having the least visible image density unevenness from the input unit 93 (Step S24). In FIG. 10, "3" is input as the number having the least visible image density unevenness.

The CPU 301 determines the amplitude of the bias voltage correction waveform "x" of Expression (2) as an amplitude corresponding to the number having the least visible image density unevenness. The CPU 301 stores the bias voltage correction waveform "x" obtained by substituting the determined amplitude into the RAM 306 (Step S25). With the above-mentioned steps, the processing of correcting the periodically-caused image density unevenness is ended.

In the image formation after the image density unevenness correction processing is ended, a bias voltage obtained by superimposing a voltage corresponding to the stored bias voltage correction waveform "x" is set as the image forming condition. The CPU 301 causes the image forming apparatus 100 to perform the image forming processing based on this image forming condition.

In the description above, an example in which the periodic image density unevenness caused by any one rotary member among the photosensitive drum 1, the charging roller 2, and the developing sleeve 41 is suppressed has been described. In a case of the periodic image density unevenness caused by two or more rotary members, the periodic image density unevenness can be suppressed by repeatedly performing the above-mentioned image density unevenness correction processing. In this case, when a band-shaped test image of an image for checking in the second image density unevenness correction is to be formed, an image forming condition reflecting the bias voltage correction waveform "x" determined in the first image density unevenness correction processing is used.

As described above, in the processing of correcting the periodic image density unevenness to be performed while the user or the service worker checks the printed image (chart), scales of the period and the phase are displayed on the charts to be used so that the checking results obtained by the user or the service worker can be easily input. The user or the service worker can easily determine the adjustment level to be input with the scales. Accordingly, the number of times of repeatedly inputting the data for adjustment and printing the image for checking can be reduced, and hence an adjustment time of the image density unevenness can be shortened. Input work to be performed by the user or the service worker in the image density unevenness correction processing can be performed through use of, other than the operation unit 200, a printer driver installed into the personal computer that is allowed to communicate bidirectionally with the image forming apparatus 100.

Second Embodiment

Figure 15:
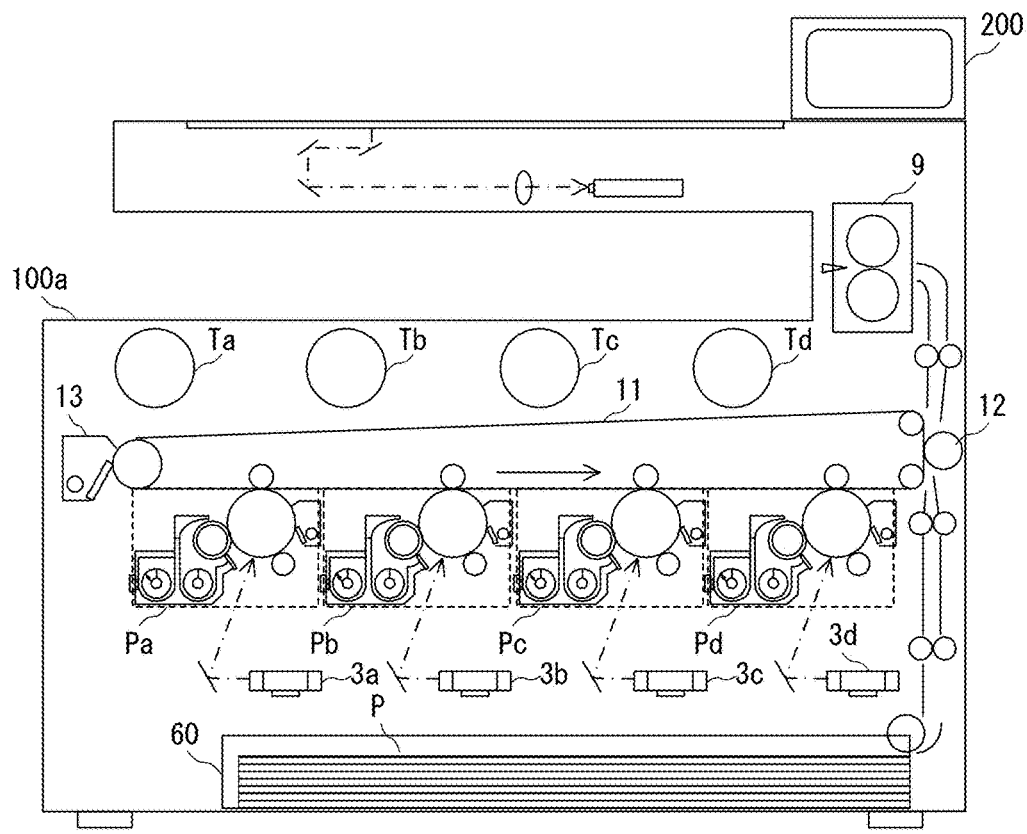
FIG. 15 is a configuration diagram of an image forming apparatus.
Figure 16:
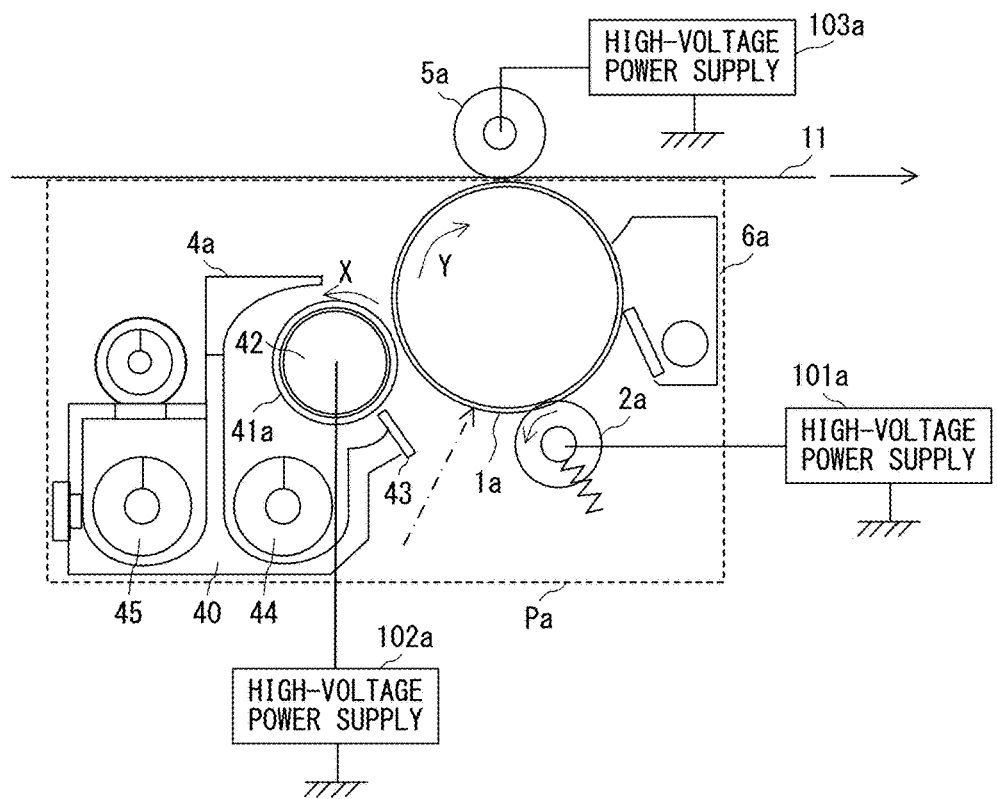
FIG. 16 is a configuration diagram of an image forming unit.

FIG. 15 is a configuration diagram of an image forming apparatus according to a second embodiment of the present disclosure. The image forming apparatus 100 according to the first embodiment is a monochrome printer, but an image forming apparatus 100*a* according to the second embodiment is a color printer. The image forming apparatus 100*a* according to the second embodiment is an electrophotographic color copying machine employing a contact charging system and a two-component developing system. The image forming apparatus 100*a* includes four image forming units Pa to Pd. FIG. 16 is a configuration diagram of the image forming unit Pa. The image forming units Pb, Pc, and Pd have the same configuration as that of the image forming unit Pa, and hence description thereof is omitted. The same components as those of the image forming apparatus 100 according to the first embodiment are denoted by the same reference symbols. Description of the same components as those of the image forming apparatus 100 according to the first embodiment is omitted.

The image forming units Pa to Pd are arranged side by side in series to each other along a rotating direction (arrow direction) of an intermediate transfer belt 11. Each of the image forming units Pa to Pd is mountable to and removable from the image forming apparatus 100*a*. The image forming unit Pa includes a photosensitive drum 1*a* serving as an image bearing member, a charging roller 2*a*, a developing device 4*a*, and a cleaner 6*a*. An exposing device 3*a* is provided on a main body of the image forming apparatus 100*a*. At a position opposed to the photosensitive drum 1*a* across the intermediate transfer belt 11, a primary transfer charging device 5*a* is provided. Although not shown, the image forming units Pb to Pd similarly include photosensitive drums 1*b* to 1*d*, charging rollers 2*b* to 2*d*, developing devices 4*b* to 4*d*, and cleaners 6*b* to 6*d*, respectively. Exposing devices 3*b* to 3*d* are provided on the main body of the image forming apparatus 100*a*. At positions opposed to the photosensitive drums 1*b* to 1*d* across the intermediate transfer belt 11, primary transfer charging devices 5*b* to 5*d* are provided.

When each of the charging rollers 2*a* to 2*d* is applied with the charging bias voltage, each of the charging rollers 2*a* to 2*d* performs contact charging processing of charging the surface of each of the rotating photosensitive drums 1*a* to 1*d* to a predetermined potential at a predetermined polarity. For example, when the charging roller 2*a* is applied with the charging bias voltage from a high-voltage power supply 101*a*, the charging roller 2*a* uniformly charges the surface of the corresponding photosensitive drum 1*a*.

The exposing devices 3*a* to 3*d* are arranged below the image forming units Pa to Pd, respectively. Each of the exposing devices 3*a* to 3*d* includes a light source and a polygon mirror. The rotation of the polygon mirror causes laser light emitted from the light source to move in one direction. Light fluxes of the laser light are deflected by a plurality of reflection mirrors, and are collected by an fθ lens and exposed on a meridional line of the surface of each of the photosensitive drums 1*a*, 1*b*, 1*c*, and 1*d*. The rotation of the polygon mirror causes the laser light to be scanned on the meridional line of each of the photosensitive drums 1*a*, 1*b*, 1*c*, and 1*d*. Such scanning by the laser light is performed after the surface of each of the photosensitive drums 1*a* to 1*d* is uniformly charged by each of the charging rollers 2*a* to 2*d*. Accordingly, electrostatic latent images corresponding to the image information are formed on the photosensitive drums 1*a*, 1*b*, 1*c*, and 1*d*, respectively.

The developing device 4*a* is loaded with a predetermined amount of two-component developer obtained by mixing yellow non-magnetic toner and magnetic carriers at a predetermined mixture ratio. The developing device 4*b* is loaded with a predetermined amount of two-component developer obtained by mixing magenta non-magnetic toner and magnetic carriers at a predetermined mixture ratio. The developing device 4*c* is loaded with a predetermined amount of two-component developer obtained by mixing cyan non-magnetic toner and magnetic carriers at a predetermined mixture ratio. The developing device 4*d* is loaded with a predetermined amount of two-component developer obtained by mixing black non-magnetic toner and magnetic carriers at a predetermined mixture ratio. For the developing devices 4*a* to 4*d*, toner replenishing units Ta to Td are provided so as to correspond thereto, respectively. When the contained non-magnetic toner is consumed through the developing processing and the toner density is thus reduced, the developing devices 4*a* to 4*d* are replenished with the non-magnetic toner of corresponding colors from the corresponding toner replenishing units Ta to Td.

The developing devices 4*a* to 4*d* develop the electrostatic latent images formed on the corresponding photosensitive drums 1*a* to 1*d*, to thereby form toner images of colors corresponding to the respective photosensitive drums 1*a* to 1*d*. For example, when the developing device 4*a* is applied with a predetermined developing bias voltage from a high-voltage power supply 102*a*, the developing device 4*a* performs the developing processing. The primary transfer charging devices 5*a* to 5*d* transfer the toner images of the respective colors formed on the photosensitive drums 1*a* to 1*d* onto the intermediate transfer belt 11 in a superimposed manner. When each of the primary transfer charging devices 5*a* to 5*d* is applied with a transfer bias voltage having a predetermined condition from a high-voltage power supply 103*a*, each of the primary transfer charging devices 5*a* to 5*d* performs transfer of the toner image. In this manner, a full-color toner image is formed on the intermediate transfer belt 11. The intermediate transfer belt 11 is rotated so that the toner images borne on the intermediate transfer belt 11 are conveyed to a secondary transfer unit 12. Transfer residual toner remaining on the photosensitive drums 1*a* to 1*d* after the transfer is removed by the cleaners 6*a* to 6*d*.

The recording medium P stored in the sheet feeding cassette 60 is fed to the secondary transfer unit 12 in accordance with the timing at which the intermediate transfer belt 11 conveys the toner images to the secondary transfer unit 12. The secondary transfer unit 12 transfers the toner images borne on the intermediate transfer belt 11 onto the recording medium P. The recording medium P having the toner images transferred thereon is applied with heat and pressure by the fixing device 9 so that the toner images are fixed. A printed matter created as described above is discharged to the outside of the image forming apparatus 100a.

The intermediate transfer belt 11 includes a belt cleaner 13 between a position of the secondary transfer unit 12 and a position of the primary transfer charging device 5a. The belt cleaner 13 removes fog toner, secondary transfer residual toner, and the like adhering to the surface of the intermediate transfer belt 11. Further, similarly to the first embodiment, a phase detection mechanism (phase detection sensor) (not shown) is provided on each of the photosensitive drums 1a to 1d, the charging rollers 2a to 2d, and developing sleeves 41a to 41d of the developing devices 4a to 4d.

(Image Density Unevenness Correction)

Figure 17:
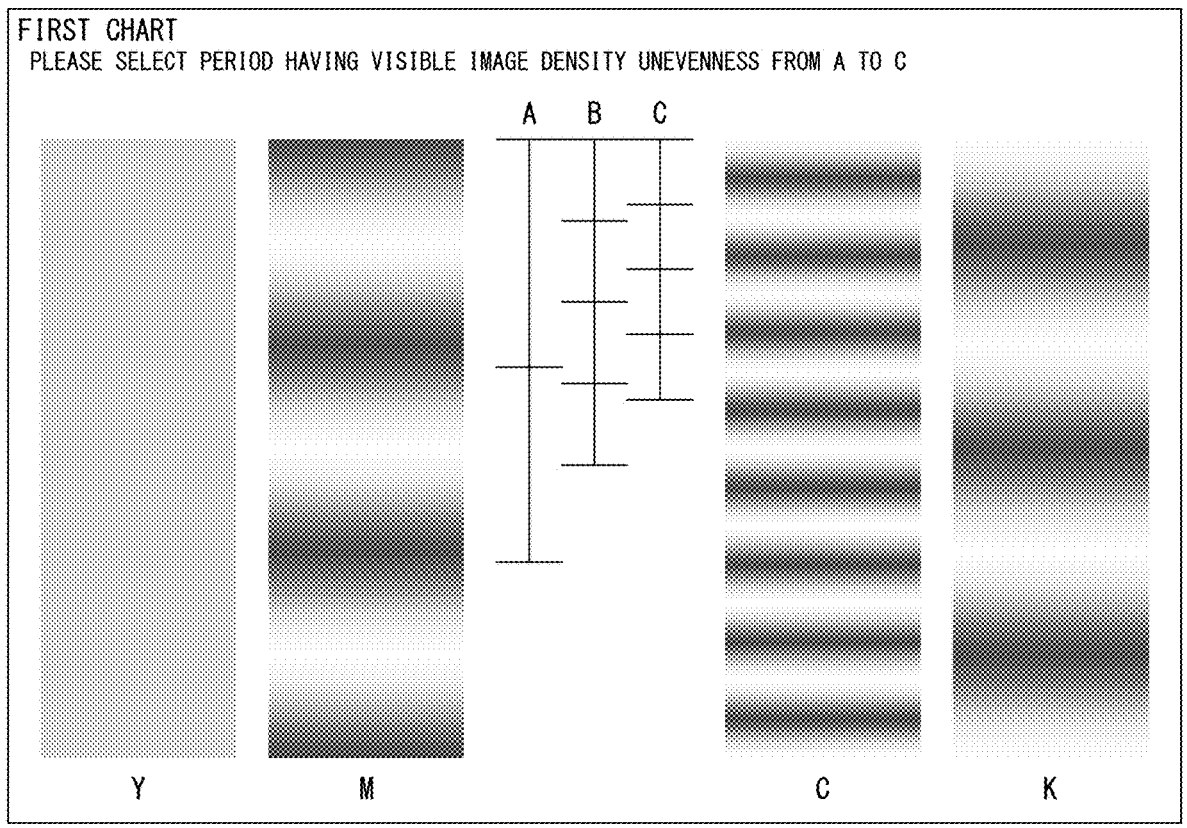
FIG. 17 is an exemplary view of a first chart.
Figure 18:
FIG. 18 is an exemplary view of an input screen.

Charts to be used for periodic image density unevenness correction and input screens to be displayed on the display unit 94 of the operation unit 200 are described. FIG. 17 is an exemplary view of a first chart. FIG. 19 is an exemplary view of a second chart. FIG. 20 is an exemplary view of a third chart. FIG. 18 is an exemplary view of an input screen. The image density unevenness correction processing in the second embodiment is described with reference to the same flow chart as that of the first embodiment (see FIG. 6).

The image density unevenness correction processing is started when the user or the service worker inputs a start instruction of the image density unevenness correction through the input unit 93 of the operation unit 200. The CPU 301 acquires this start instruction from the input unit 93 so as to activate an adjustment mode (Step S11), and displays an input screen for giving an instruction to output a chart exemplified in FIG. 17 on the display unit 94 (Step S12). When the user or the service worker selects a "cancel" button from this input screen, the image density unevenness correction processing is ended.

When the CPU 301 detects the selection of a "first chart output" button performed by the user or the service worker (Step S13), the CPU 301 causes the image forming apparatus 100a to create a first chart exemplified in FIG. 17 under an image forming condition in which no image density unevenness correction is performed (Step S14). The first chart is discharged from the image forming apparatus 100a. In the first chart, band-shaped test images of respective colors of yellow (Y), magenta (M), cyan (C), and black (K), which are long in the conveying direction of the recording medium P, scales representing the periods of the rotary members, and instruction messages for the user or the service worker to perform the next operation are printed. The scales are the same as those of the first chart (FIG. 11) in the first embodiment.

The CPU 301 which has created the first chart displays a period input screen exemplified in FIG. 18 on the display unit 94 (Step S15). Input units for periods of the four colors are provided on the input screen. The user or the service worker checks the first chart, and inputs, through the input unit 93, a symbol of a period having noticeable image density unevenness from the input screen of FIG. 18. Further, the user or the service worker selects the "second chart output" button through the input unit 93. The CPU 301 acquires the symbol of the period having the noticeable image density unevenness from the input unit 93, and detects that the "second chart output" button has been selected (Step S16). In the example of FIG. 18, as the period having the noticeable image density unevenness, no symbol is input for yellow (Y), but symbol A is input for magenta (M), symbol B is input for cyan (C), and symbol A is input for black (K).

The CPU 301 detects the home position of the rotary member corresponding to the symbol of the selected period through use of the phase detection sensor 50 (Step S17). The CPU 301 creates a second chart exemplified in FIG. 19 so that the timing of the detected home position and the position of the image to be formed are matched with each other (Step S18). The second chart is discharged from the image forming apparatus 100a.

In the second chart, band-shaped test images (each having a length corresponding to one period of respective rotary members input in the process step of Step S16) extending in the conveying direction of the recording medium P, scales obtained by equally dividing one period of these rotary members, and instruction messages for the user or the service worker to perform the next operation are printed. In the second embodiment, scales obtained by equally dividing one period of the rotary members into twelve parts are printed. The period A is printed for the scale corresponding to the photosensitive drums 1b and 1d. The period B is printed for the scale corresponding to the charging roller 2c. Numbers of from 0 to 11 are printed for respective divisions of the scale. The test images and the scales are printed so that the position of "0" of the scale matches the home position of the rotary member. When the user or the service worker does not select a symbol in the process step of Step S16 because there is a color having less noticeable periodic image density unevenness in the test images of the four colors, the test image of the color that has not been selected is not printed in the second chart.

In this case, the photosensitive drums 1a to 1d, the charging rollers 2a to 2d, and the developing sleeves 41a to 41d being adjustment target members of the respective colors do not always have the same phase. Accordingly, there is a possibility that, when the test images of the four colors are formed, the position of the number 0 assigned to the scale of the second chart does not become the position of the home position detected by the phase detection sensor.

In view of the above, in the second embodiment, the yellow test image is printed so that the position of the home position of the adjustment target member of the yellow image forming unit Pa in which the image formation is first performed is located at the position of the number 0 assigned to the scale. Numbers at the closest positions are stored for the home positions of the adjustment target members of the other image forming units Pb to Pd. When the bias voltage correction waveform "x" is to be created in the process step of Step S21, an offset corresponding to the stored number is applied to the phase of the bias voltage correction waveform.

Further, as another method, even when the second chart is created by forming the test images of the four colors so as to match the home positions of the adjustment target members of the image forming units Pa to Pd, respectively, similar adjustment by the user or the service worker is allowed. As further another method, even when the number to be assigned to the scale of the second chart is changed for each color so that the relationship between the number and the phase of the adjustment target member becomes the same among the four colors, similar adjustment by the user or the service worker is allowed.

The CPU 301 which has created the second chart displays a phase input screen on the display unit 94 (Step S19). This input screen is the input screen exemplified in FIG. 9, and the phase can be input for each color of yellow, magenta, cyan, or black. The user or the service worker checks the second chart, and inputs, through the input unit 93, a number of a position having the highest image density for each color from the input screen. Further, the user or the service worker selects the "third chart output" button through the input unit 93. The CPU 301 acquires the number of the position having the highest image density from the input unit 93, and detects that the "third chart output" button has been selected (Step S20).

The CPU 301 creates a bias voltage correction waveform "x" based on the period acquired in the process step of Step S16 and the position (phase) acquired in the process step of Step S20 (Step S21). The CPU 301 prints test images onto the recording medium P while switching an amplitude level of the created bias voltage correction waveform "x", to thereby create a third chart exemplified in FIG. 20 (Step S22). The third chart is discharged from the image forming apparatus 100a.

In the third chart, four test images of each color obtained in different image forming conditions by changing the amplitude level of the bias voltage correction waveform "x", numbers representing the amplitude levels, and instruction messages for the user or the service worker to perform the next operation are printed. The test images are band-shaped images that extend in the conveying direction of the recording medium P, and two test images are printed on each of both surfaces of the recording medium P. In the third embodiment, the test images are formed with the voltage of the amplitude of each bias voltage correction waveform "x" being changed in steps of 10 V in the color of the symbol selected in the process step of Step S16. The test image of the color (yellow) whose symbol has not been selected in the process step of Step S16 is not formed. Each of the charging rollers 2a to 2d of respective colors is applied with a DC voltage of −500 V and a sine-wave AC voltage having a frequency of 1.3 kHz and a peak-to-peak voltage Vpp of 1.5 kV from the high-voltage power supply 101a. A DC voltage (correction voltage) corresponding to the bias voltage correction waveform is superimposed on this voltage which is originally applied, and the third chart is created. In the third chart, a plurality of test images are printed in accordance with a plurality of correction voltages whose amplitude levels are changed. When the developing sleeves 41 are selected as having the period of the image density unevenness, the correction voltage corresponding to the bias voltage correction waveform "x" is superimposed on the developing bias voltage applied from the high-voltage power supply 102a while switching the amplitude level, and the third chart is created.

The CPU 301 which has created the third chart displays an amplitude input screen exemplified on the display unit 94 (Step S23). The user or the service worker checks the third chart, inputs, through the input unit 93, a number having the least visible image density unevenness from the input screen, and selects an "OK" button. The CPU 301 acquires the number having the least visible image density unevenness from the input unit 93 (Step S24). The CPU 301 determines the amplitude of the bias voltage correction waveform "x" of Expression (2) to an amplitude corresponding to the number having the least visible image density unevenness. The CPU 301 stores the bias voltage correction waveform "x" obtained by substituting the determined amplitude into the RAM 306 (Step S25). With the above-mentioned steps, the processing of correcting the periodically-caused image density unevenness is ended.

In the image formation after the image density unevenness correction processing is ended, a bias voltage obtained by superimposing a voltage corresponding to the stored bias voltage correction waveform "x" is set as the image forming condition. The CPU 301 causes the image forming apparatus 100a to perform the image forming processing based on this image forming condition.

Similarly to the first embodiment, in the case of the periodic image density unevenness caused by two or more rotary members, the periodic image density unevenness can be suppressed by repeatedly performing the above-mentioned image density unevenness correction processing. In this case, when the band-shaped test image of the image for checking in the second image density unevenness correction is to be formed, the image forming condition reflecting the bias voltage correction waveform "x" determined in the first image density unevenness correction processing is used.

As described above, in the processing of correcting the periodic image density unevenness to be performed while the user or the service worker checks the printed image (chart), scales of the period and the phase are displayed on the charts to be used so that the checking results obtained by the user or the service worker can be easily input. The user or the service worker can easily determine the adjustment level to be input with the scales. Accordingly, the number of times of repeatedly inputting the data for adjustment and printing the image for checking can be reduced, and hence an adjustment time of the image density unevenness can be shortened. Input work to be performed by the user or the service worker in the image density unevenness correction processing can be performed through use of, other than the operation unit 200, a printer driver installed into the personal computer that is allowed to communicate bidirectionally with the image forming apparatus 100a.

Third Embodiment

In the second embodiment, a chart including test images of four colors of yellow, magenta, cyan, and black is used so that the periodic image density unevenness correction is performed simultaneously for the four colors. In contrast, in a third embodiment of the present disclosure, the correction of the periodic image density unevenness of yellow is adjusted by checking a test image of a secondary color obtained by superimposing yellow and cyan. A configuration of an image forming apparatus according to the third embodiment is the same as the configuration of the image forming apparatus 100a according to the second embodiment.

Figure 21:
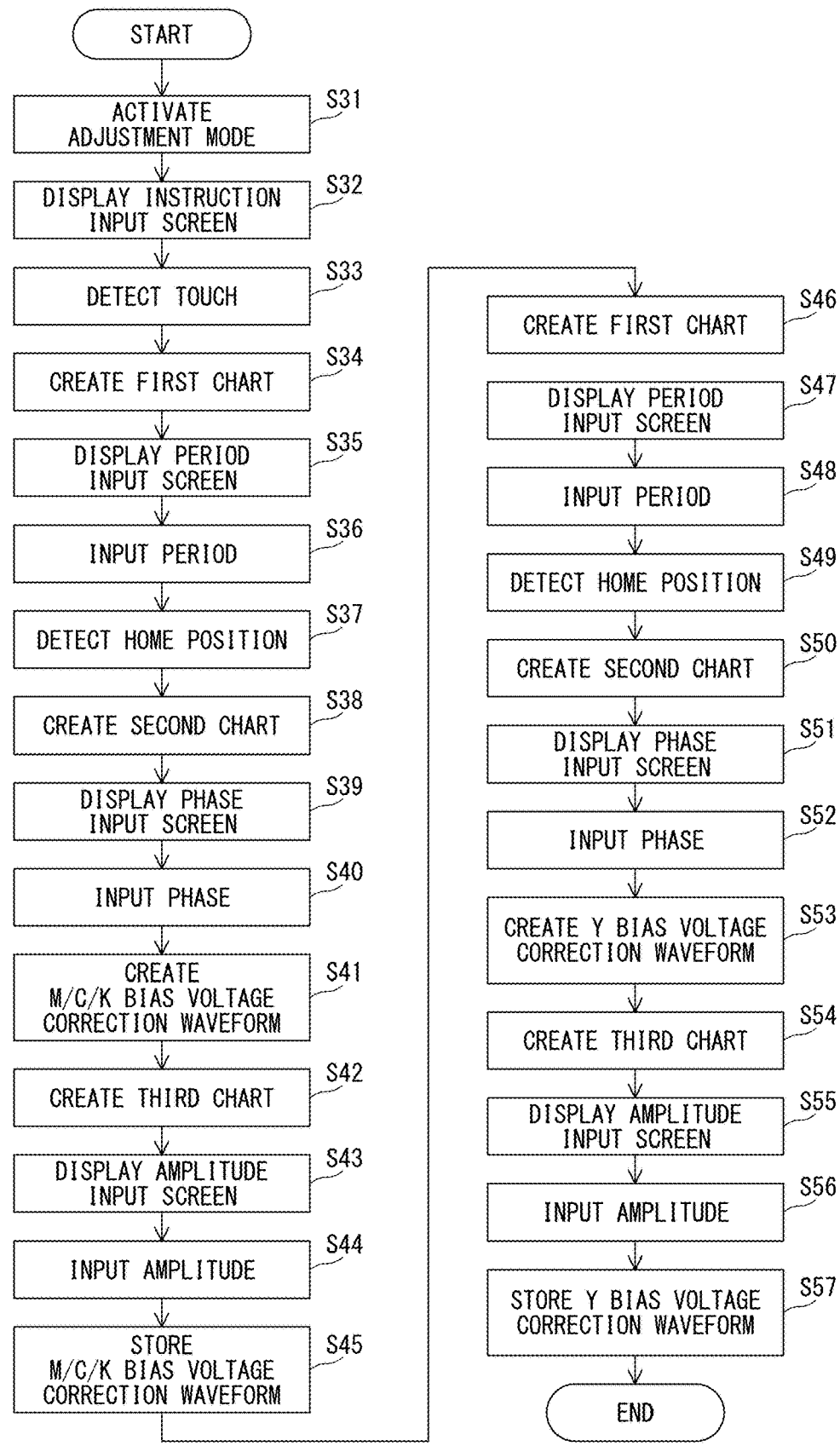
FIG. 21 is a flow chart for illustrating image density unevenness correction processing.

FIG. 21 is a flow chart for illustrating the image density unevenness correction processing performed by the image forming apparatus 100a according to the third embodiment. FIG. 22 and FIG. 23 are exemplary views of first charts.

The image density unevenness correction processing is started when the user or the service worker inputs a start instruction of the image density unevenness correction through the input unit 93 of the operation unit 200. The CPU 301 acquires this start instruction from the input unit 93 so as to activate an adjustment mode (Step S31), and displays an input screen for giving an instruction to output a chart exemplified in FIG. 7 on the display unit 94 (Step S32). When the user or the service worker selects a "cancel" button from this input screen, the image density unevenness correction processing is ended.

When the CPU 301 detects the selection of a "first chart output" button performed by the user or the service worker (Step S33), the CPU 301 causes the image forming apparatus 100a to create a first chart exemplified in FIG. 22 under an image forming condition in which no image density unevenness correction is performed (Step S34). The first chart is discharged from the image forming apparatus 100a.

In the first chart, band-shaped test images of respective colors of magenta (M), cyan (C), and black (K), which are long in the conveying direction of the recording medium P, scales representing the periods of the rotary members, and instruction messages for the user or the service worker to perform the next operation are printed. The scales are the same as those of the first embodiment (FIG. 11).

The CPU 301 which has created the first chart displays a period input screen exemplified in FIG. 18 on the display unit 94 (Step S35). The user or the service worker checks the first chart, and inputs, through the input unit 93, a symbol of a period having noticeable image density unevenness from this input screen. Further, the user or the service worker selects the "second chart output" button through the input unit 93. The CPU 301 acquires the symbol of the period having the noticeable image density unevenness from the input unit 93, and detects that the "second chart output" button has been selected (Step S36).

The CPU 301 detects the home position of the rotary member corresponding to the symbol of the selected period through use of the phase detection sensor 50 (Step S37). This rotary member is a rotary member related to image formation of each of magenta, cyan, and black. The CPU 301 creates a second chart so that the timing of the detected home position and the position of the image to be formed are matched with each other (Step S38). The second chart is discharged from the image forming apparatus 100a. In the second chart, the test images, scales each obtained by equally dividing one period of each of the rotary members, and instruction messages for the user or the service worker to perform the next operation are printed. The test image is a band-shaped image having a length corresponding to one period of the rotary member input in the process step of Step S36, which extends in the conveying direction of the recording medium P. The test images are printed for magenta, cyan, and black, but no test image is printed for yellow.

The CPU 301 which has created the second chart displays a phase input screen on the display unit 94 (Step S39). This input screen is the input screen exemplified in FIG. 9, and the phase can be input for each color of magenta, cyan, or black. The user or the service worker checks the second chart, and inputs, through the input unit 93, the number of the position having the highest image density for each color from the input screen. Further, the user or the service worker selects the "third chart output" button through the input unit 93. The CPU 301 acquires the number of the position having the highest image density from the input unit 93, and detects that the "third chart output" button has been selected (Step S40).

The CPU 301 creates the bias voltage correction waveform "x" of each of magenta (M), cyan (C), and black (K) based on the period acquired in the process step of Step S36 and the position (phase) acquired in the process step of Step S40 (Step S41). The CPU 301 prints test images onto the recording medium P while switching the amplitude level of the created bias voltage correction waveform "x," to thereby create a third chart (Step S42). The third chart is discharged from the image forming apparatus 100a. In the third chart, four band-shaped test images of each color extending in the conveying direction of the recording medium P, which are obtained in different image forming conditions by changing the amplitude level of the bias voltage correction waveform "x", numbers representing the amplitude levels, and instruction messages for the user or the service worker to perform the next operation are printed. The test images are formed in magenta, cyan, and black.

The CPU 301 which has created the third chart displays an amplitude input screen on the display unit 94 (Step S43). The user or the service worker checks the third chart, inputs, through the input unit 93, a number having the least visible image density unevenness from the input screen, and selects an "OK" button. The CPU 301 acquires the number having the least visible image density unevenness from the input unit 93 (Step S44). The CPU 301 determines the amplitude of the bias voltage correction waveform "x" of each of magenta (M), cyan (C), and black (K) as an amplitude corresponding to the number having the least visible image density unevenness. The CPU 301 stores the bias voltage correction waveform "x" of each of magenta (M), cyan (C), and black (K) obtained by substituting the determined amplitude into the RAM 306 (Step S45). With the above-mentioned steps, the processing of correcting the periodically-caused image density unevenness of magenta, cyan, and black is ended.

Subsequently, the periodic image density unevenness correction of yellow is performed. The CPU 301 causes the image forming apparatus 100a to create a first chart exemplified in FIG. 23 under an image forming condition in which the image density unevenness correction of yellow is not performed (Step S46). The first chart is discharged from the image forming apparatus 100a. In the first chart, a band-shaped test image of a secondary color obtained by superimposing yellow (Y) and cyan (C), which is long in the conveying direction of the recording medium P, scales representing the periods of the rotary members, and instruction messages for the user or the service worker to perform the next operation are printed. Cyan is formed under an image forming condition including a condition of a bias obtained by superimposing the voltage of the bias voltage correction waveform "x" of cyan, which is stored in the process step of Step S45. The periods of the scales are the same as those of the first embodiment (FIG. 11).

The CPU 301 which has created the first chart displays a period input screen on the display unit 94 (Step S47). The user or the service worker checks the first chart, and inputs, through the input unit 93, a symbol of the period having the noticeable image density unevenness from the input screen. Further, the user or the service worker selects the "second chart output" button through the input unit 93. The CPU 301 acquires the symbol of the period having the noticeable image density unevenness from the input unit 93, and detects that the "second chart output" button has been selected (Step S48).

The CPU 301 detects the home position of the rotary member corresponding to the symbol of the selected period through use of the phase detection sensor 50 (Step S49). This rotary member is a rotary member related to image formation of yellow. The CPU 301 creates a second chart so that the timing of the detected home position and the position of the image to be formed are matched with each other (Step S50). The second chart is discharged from the image forming apparatus 100a. In the second chart, the test image, a scale obtained by equally dividing one period of this rotary member, and instruction messages for the user or the service worker to perform the next operation are printed. The test image is a band-shaped image having a length corresponding to one period of the rotary member input in the process step of Step S48, which extends in the conveying direction of the recording medium P, and is formed in a secondary color obtained by superimposing yellow and cyan.

The CPU 301 which has created the second chart displays a phase input screen on the display unit 94 (Step S51). The user or the service worker checks the second chart, and inputs, through the input unit 93, the number of the position having the highest image density from the input screen. Further, the user or the service worker selects the "third chart output" button through the input unit 93. The CPU 301 acquires the number of the position having the highest image density from the input unit 93, and detects that the "third chart output" button has been selected (Step S52).

The CPU 301 creates the bias voltage correction waveform "x" of yellow based on the period acquired in the process step of Step S48 and the position (phase) acquired in the process step of Step S52 (Step S53). The CPU 301 prints test images onto the recording medium P while switching the amplitude level of the created bias voltage correction waveform "x", to thereby create a third chart (Step S54). The third chart is discharged from the image forming apparatus 100a. In the third chart, four band-shaped test images extending in the conveying direction of the recording medium P, which are obtained in different image forming conditions by changing the amplitude level of the bias voltage correction waveform "x", numbers representing the amplitude levels, and instruction messages for the user or the service worker to perform the next operation are printed. The test image is formed in a secondary color of yellow and cyan.

The CPU 301 which has created the third chart displays an amplitude input screen on the display unit 94 (Step S55). The user or the service worker checks the third chart, inputs, through the input unit 93, a number having the least visible image density unevenness from the input screen, and selects an "OK" button. The CPU 301 acquires the number having the least visible image density unevenness from the input unit 93 (Step S56). The CPU 301 determines the amplitude of the bias voltage correction waveform "x" of yellow to an amplitude corresponding to the number having the least visible image density unevenness. The CPU 301 stores the bias voltage correction waveform "x" of yellow obtained by substituting the determined amplitude into the RAM 306 (Step S57). With the above-mentioned steps, the processing of correcting the periodically-caused image density unevenness of yellow is ended.

Similarly to the first embodiment, in a case of the periodic image density unevenness caused by two or more rotary members, the periodic image density unevenness can be suppressed by repeatedly performing the above-mentioned image density unevenness correction processing. In this case, when the band-shaped test image of the image for checking in the second image density unevenness correction is to be formed, the image forming condition reflecting the bias voltage correction waveform "x" determined in the first image density unevenness correction processing is used.

As described above, in the processing of correcting the periodic image density unevenness to be performed while the user or the service worker checks the printed image (chart), scales of the period and the phase are displayed on the charts to be used so that the checking results obtained by the user or the service worker can be easily input. The user or the service worker can easily determine the adjustment level to be input with the scales. Accordingly, the number of times of repeatedly inputting the data for adjustment and printing the image for checking can be reduced, and hence an adjustment time of the image density unevenness can be shortened. Input work to be performed by the user or the service worker in the image density unevenness correction processing can be performed through use of, other than the operation unit 200, a printer driver installed into the personal computer that is allowed to communicate bidirectionally the image forming apparatus 100a.

Further, in the chart used when the periodic image density unevenness caused in the yellow image is to be corrected, when the test image of yellow alone is changed to the test image of the secondary color of yellow and cyan, the viewability of the image density unevenness of yellow is improved. Accordingly, the image density unevenness correction of the yellow image is performed with higher accuracy. In the third embodiment, a case of the secondary color of yellow and cyan is described, but even when a test image of a secondary color of yellow and magenta is used, the viewability of the image density unevenness of yellow is improved, and the image density unevenness correction of the yellow image is performed with higher accuracy.

As described above in the first to third embodiments, an output image (chart) to be checked by the user or the service worker at the time of correction control of the periodic image density unevenness is created by adding scales representing period information and phase information to the test image for checking the image density unevenness. Through use of the chart having the scales printed thereon, the adjustment level to be input becomes clear. Accordingly, the number of times of repeatedly inputting the data for adjustment and printing the image for checking can be reduced, and hence an adjustment time of the image density unevenness can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-120035, filed Jul. 20, 2021, which is hereby incorporated by reference herein in its entirety.

What is claimed is:

1. An image forming apparatus comprising:
   an image forming unit configured to convey a recording medium, and form an image on the recording medium based on an image forming condition; and
   a controller configured to control the image forming unit to form a test image and a scale image extending in a conveyance direction in which the recording medium is conveyed, obtain user instruction information related to a density fluctuation of the test image in the conveyance direction, and generate the image forming condition to suppress image density unevenness in the conveyance direction in an image to be formed by the image forming unit based on the user instruction information.

2. The image forming apparatus according to claim 1, wherein the scale image is used for determining a period of the density fluctuation of the test image.

3. The image forming apparatus according to claim 1, wherein the scale image is used for determining a position of a maximum density of the test image.

4. The image forming apparatus according to claim 1, wherein the image forming unit has a plurality of rotary members,
   wherein the scale image includes images representing a period of each of the plurality of rotary members.

* * * * *